United States Patent
Nasu et al.

(10) Patent No.: US 8,560,799 B2
(45) Date of Patent: Oct. 15, 2013

(54) PERFORMANCE MANAGEMENT METHOD FOR VIRTUAL VOLUMES

(75) Inventors: Hiroshi Nasu, Yokohama (JP); Hirokazu Ikeda, Yamato (JP); Yoshiaki Eguchi, Yokohama (JP); Toshimichi Kishimoto, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/811,328

(22) PCT Filed: Feb. 18, 2010

(86) PCT No.: PCT/JP2010/001067
§ 371 (c)(1),
(2), (4) Date: Jun. 30, 2010

(87) PCT Pub. No.: WO2011/101909
PCT Pub. Date: Aug. 25, 2011

(65) Prior Publication Data
US 2012/0131302 A1   May 24, 2012

(51) Int. Cl.
*G06F 12/00* (2006.01)
(52) U.S. Cl.
USPC ............... 711/170; 711/154; 711/E12.002; 711/E12.084
(58) Field of Classification Search
USPC ............... 711/170, 154, E12.002, E12.084
See application file for complete search history.

(56) References Cited

U.S. PATENT DOCUMENTS

| 7,447,832 | B2 | 11/2008 | Kano et al. |
| 2007/0055713 | A1 | 3/2007 | Nagai et al. |
| 2008/0126734 | A1* | 5/2008 | Murase ............... 711/170 |
| 2009/0043942 | A1 | 2/2009 | Shiga |
| 2009/0300285 | A1 | 12/2009 | Nagai et al. |

FOREIGN PATENT DOCUMENTS

| JP | 2003015915 A | 1/2003 |
| JP | 2007066259 A | 3/2007 |
| JP | 2009043055 A | 2/2009 |

* cited by examiner

*Primary Examiner* — Larry Mackall
(74) *Attorney, Agent, or Firm* — Volpe and Koenig, P.C.

(57) ABSTRACT

Multiple types of storage devices which have different performance are appropriately allocated to multiple virtual volumes in accordance with the performance requirements of the respective virtual volumes. In cases where, among virtual volumes 82 for which response times have been specified, there is a [virtual volume] that has a shortage of pages to which SSDs 70 should be allocated and that does not satisfy the performance requirement when its Tier boundary value $\beta$ is adjusted to Tier boundary value $\beta'$ and, if unallocated pages as the pages to which SSDs 70 should be allocated do not exist, Tier boundary value $\gamma$ or Tier boundary value $\alpha$ of another virtual volume is adjusted to Tier boundary value $\gamma'$ or the Tier boundary value $\alpha'$, and pages to which SSDs 70 are allocated are secured in the virtual volume 82 for which the Tier boundary value has been adjusted.

13 Claims, 17 Drawing Sheets

| Tier ID | MEDIA TYPE | RESPONSE TIME | TIER BOUNDARY VALUE (IOPS) [DEFAULT] |
|---|---|---|---|
| Tier0 | SSD | 1 | 2500 |
| Tier1 | SATA | 10 | 0 |

FIG.8

| VOLUME ID (130) | POOL ID (132) | START ADDRESS (134) | ENDING ADDRESS (136) | ALLOCATED PAGE ID (138) | CAPACITY (GB) (140) |
|---|---|---|---|---|---|
| vol0 | 0 | 0 | 999 | 501 | 100 |
| | | 1000 | 1999 | 0 | |
| | | 2000 | 2999 | 502 | |
| | | ... | ... | ... | |
| vol1 | 0 | 0 | 999 | 1 | 500 |
| | | 1000 | 1999 | 500 | |
| | | ... | ... | ... | |

FIG.9

| VIRTUAL VOLUME ID (150) | Tier ID (152) | TIER BOUNDARY VALUE (IOPS) (154) |
|---|---|---|
| vol0 | Tier0 | 2400 |
| | Tier1 | <default> |
| vol1 | Tier0 | <default> |
| | Tier1 | <default> |

FIG.10

| VIRTUAL VOLUME ID | RESPONSE TIME | PERFORMANCE REQUIREMENT | PRIORITY (LARGER NUMBER INDICATES HIGHER PRIORITY) |
|---|---|---|---|
| vol0 | 7 | RESPONSE TIME < 5 | 10 |
| vol1 | 10 | RESPONSE TIME < 15 | 3 |

FIG.18

THE VOLUMES BELOW CANNOT SATISFY
PERFORMANCE REQUIREMENT.
CAPACITY MUST BE ADDED TO EACH TIER

| VOLUME ID | RESPONSE TIME | PERFORMANCE REQUIREMENT | CAPACITY SHORTFALL | |
|---|---|---|---|---|
| vol6 | 15 ms | RESPONSE TIME < 10 | Tier0 | 0.5 GB |
| vol11 | 20 ms | RESPONSE TIME < 15 | Tier0 | 1.0 GB |

PERFORMANCE MANAGEMENT METHOD FOR VIRTUAL VOLUMES

TECHNICAL FIELD

This invention relates to a control method of virtual volumes for controlling virtual volumes to which multiple logical volumes are allocated created in storage areas in multiple types of storage devices of different performance; and a storage apparatus.

BACKGROUND ART

A storage apparatus connected to a host computer via a network, as a storage device for storing data, includes, for example, multiple magnetic disks. The storage apparatus, with the RAID (Redundant Array of Independent (or Inexpensive) Disks) technology, makes the storage areas of the multiple storage devices redundant and configures RAID groups. Furthermore, the storage apparatus provides, to the host computer, a storage area of the capacity required by the host computer, the storage area being a part of the RAID groups and provided in the form of logical volumes. Generally, examples of logical volumes in storage apparatuses include logical volumes configured from high-performance and expensive storage devices; logical volumes configured from low-performance and inexpensive storage devices; and logical volumes configured having different degrees of redundancy of the RAID configuration, and they are used for different purposes.

Furthermore, the storage apparatus has the Thin Provisioning technology. Thin Provisioning is the technology in which [the storage apparatus], instead of providing a logical volume as a storage area of a fixed capacity to the host computer, provides a virtual logical volume (virtual volume) to the host computer and, in accordance with, for example, data write processing by the host computer to the storage apparatus, allocates, from storage areas (pool) created from multiple logical volumes, storage areas in units of storage area allocation units called pages, to the virtual volume. With the Thin Provisioning technology, some storage apparatuses can dynamically expand the storage capacity to provide to the host computer (see Patent Literature 1).

Here, a page is a storage area created by splitting logical volumes configuring the pool (pool volume) into parts having appropriate capacities according to logical block addresses (LBAs (Logical Block Address)). A page might also be referred to as a segment. Meanwhile, an LBA is the address used, when the host computer reads/writes data from/to the storage apparatus, for designating a data read/write location in the logical volume provided to the host.

A technology of performing efficient operation of a pool configured from pool volume groups of different performance has been proposed (see Patent Literature 2). In this technology, a management server or a storage apparatus monitors the access status (e.g. the number of times of read/write per unit of time (IOPS)) of each page allocated to a virtual volume. With reference to the access statuses of the monitored pages, the pages of high frequencies of use are dynamically migrated to storage areas in a pool volume configured from expensive and highly-reliable storage devices, and the pages of low frequencies of use are dynamically migrated to storage areas in a pool volume configured from low-cost storage devices. With this method, deterioration of performance and reliability of the virtual volume and an increase in the operation cost of the storage apparatus can be prevented.

CITATION LIST

Patent Literature

[PTL 1]
Japanese Unexamined Patent Application Publication No. 2003-015915
[PTL 2]
Japanese Unexamined Patent Application Publication No. 2007-066259

SUMMARY OF INVENTION

Technical Problem

As described above, it is possible to record the access status of each page of a logical volume, for example, the number of accesses to the logical volume per unit of time and, with reference to the recorded number of accesses, select the type of storage devices to be allocated to the logical volume. For example, if the number of accesses to the logical volume per unit of time is higher than a reference value, it is possible to allocate highly-reliable storage devices to the logical volume while, if the number of accesses to the logical volume per unit of time is lower than the reference value, it is possible to allocate inexpensive storage devices to the logical volume.

However, if multiple types of application programs are used by the host computer, because different application programs access different access target logical volumes, if a fixed reference value for determining the level of the number of accesses is set for logical volumes as access targets for the respective application programs, for example, virtual volumes, and if the application programs have different tendencies of the number of accesses, it becomes impossible to allocate appropriate storage devices to virtual volumes in accordance with the application programs.

In this case, it may be possible to set a different reference value for each virtual volume corresponding to an application program, as a reference value for determining the level of the number of accesses.

However, even if different reference values are set to different virtual volumes, there is a possibility that, when, for example, there is an increase in the amount of information to be stored in the entire apparatus, despite an attempt to increase the number of high-performance storage devices as the storage devices to be allocated to some of the virtual volumes, because of the shortage of the storage capacity of the high-performance storage devices, high-performance storage devices cannot be allocated to some virtual volumes, and the performance requirements of these virtual volumes, the access time for example, cannot be satisfied.

This invention has been devised in view of the above-mentioned problems in the conventional technologies, and the purpose of the invention is to provide a control method of virtual volumes and a storage apparatus which can allocate multiple types of storage devices of different performance to multiple virtual volumes having virtual storage areas which are access targets for an access request source, in accordance with the performance requirement of each virtual volume.

Solution to Problem

For achieving the above-mentioned purpose, this invention measures an access frequency per certain period of time of each page in a virtual volume; and, with reference to this measurement results, when allocating storage areas in the logical volumes created in high-performance storage devices or storage areas in the logical volumes created in low-performance storage devices, if, among multiple virtual volumes, there are virtual volumes for which performance requirements have been set but are not satisfied due to absence of pages to which storage areas in the logical volumes created in the high-performance storage devices are allocated, calculates, on condition that no virtual volume includes any unallocated areas, pages in other virtual volumes to which storage areas can be allocated from the logical volumes created in the high-performance storage devices; releases the determined pages from the other virtual volumes; and allocates the released pages to virtual volumes which do not satisfy the performance requirement.

Advantageous Effects of Invention

According to this invention, it is possible to allocate, to multiple virtual volumes having virtual storage areas to be accessed by an access request source, multiple types of storage devices of different performance appropriately in accordance with the performance requirement of each virtual volume.

BRIEF DESCRIPTION OF DRAWINGS

FIG. 1 is a block diagram of a storage system to which this invention is applied.
FIG. 2 is a memory configuration diagram of a management computer.
FIG. 3 is a memory configuration diagram of a storage apparatus.
FIG. 4 is a configuration diagram for illustrating the configuration of virtual volumes.
FIG. 5 is a conceptual diagram for illustrating the concept of virtual volumes.
FIG. 6 is a configuration diagram of a Tier configuration management table.
FIG. 7 is a configuration diagram of a pool resource management table.
[FIG. 8]
FIG. 8 is a configuration diagram of a virtual volume configuration management table.
[FIG. 9]
FIG. 9 is a configuration diagram of a virtual volume Tier boundary value management table.
[FIG. 10]
FIG. 10 is a configuration diagram of a virtual volume performance management table.
FIG. 11 is a flowchart for describing the processing by a virtual volume performance measurement program.
FIG. 12 is a diagram for describing the characteristic of a function set by the relationship between the IOPS and the number of pages in a virtual volume for which a Tier boundary value $\beta$ has been set.
FIG. 13 is a flowchart for describing the processing by a Tier boundary value adjustment program.
FIG. 14 is a flowchart for describing the content of the processing A.
FIG. 15 is a flowchart for describing the content of the processing B.
FIG. 16 is a diagram for describing the characteristic of a function set by the relationship between the IOPS and the number of pages in a virtual volume for which a Tier boundary value $\gamma$ has been set.
FIG. 17 is a diagram for describing the characteristic of a function set by the relationship between the IOPS and the number of pages in a virtual volume for which a Tier boundary value $\alpha$ has been set.
[FIG. 18]
FIG. 18 is a diagram showing an example display of a display screen for displaying the information of a virtual volume that does not satisfy a performance requirement.
FIG. 19 is a diagram showing an example display of a virtual volume creation screen.

DESCRIPTION OF EMBODIMENT

Example

According to this embodiment, if, among multiple virtual volumes, any of the virtual volumes for which a response time (performance value) is defined as a performance requirement does not satisfy the performance requirement because of a shortage of pages to be allocated from high-performance storage devices and a decrease in the response time, and if there is no unallocated pages, as pages to be allocated, in the high-performance storage devices, a Tier boundary value set for each virtual volume, as a reference value for determining the level of the access frequency per certain period of time (IOPS), is adjusted and pages which are to be allocated from the high-performance storage devices are secured for the virtual volume for which the Tier boundary value has been adjusted.

Figure 1:
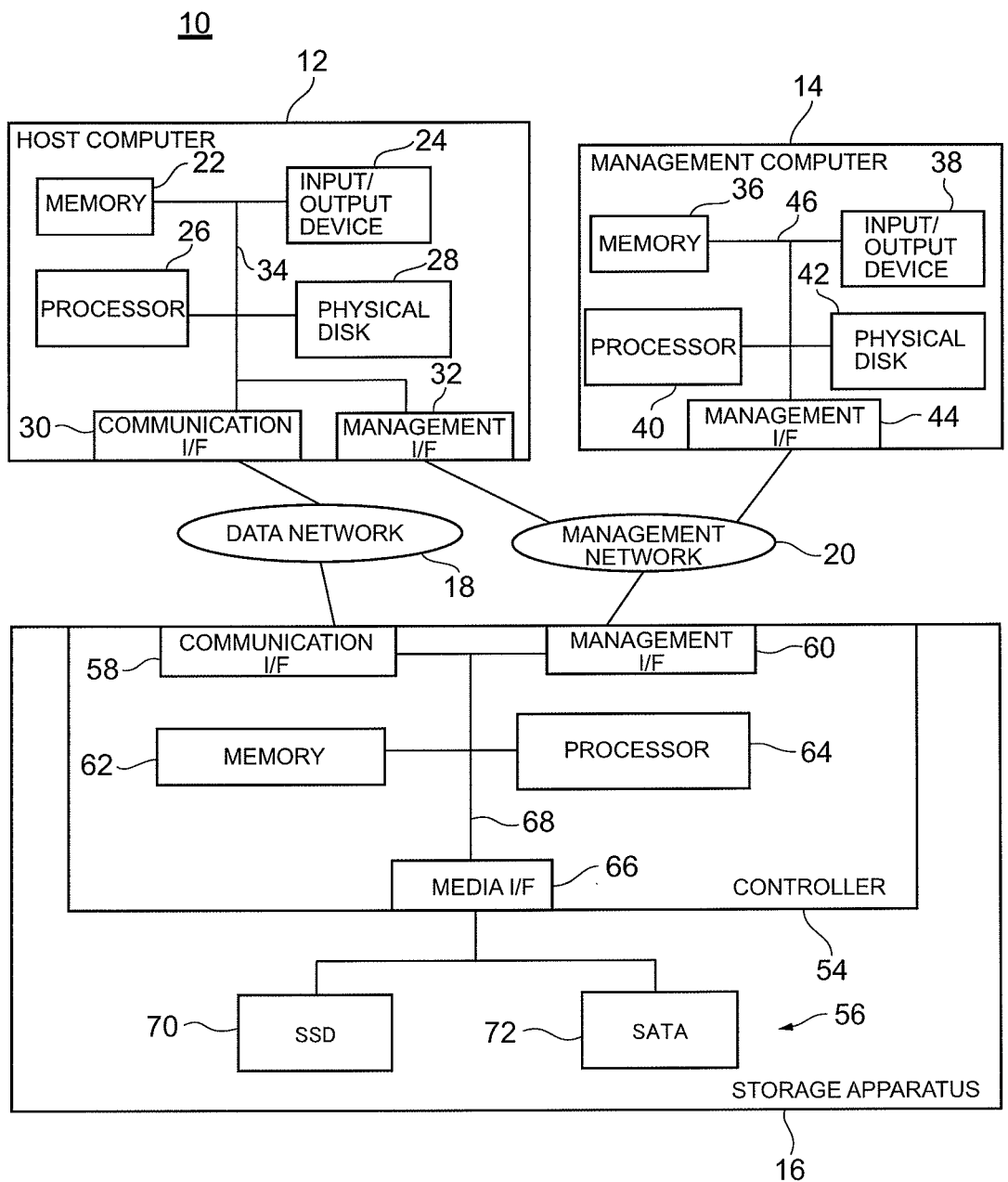
[FIG. 1]

Hereinafter, an embodiment of this invention is described with reference to the figures. FIG. 1 is a block configuration diagram of a storage system to which this invention is applied.

In FIG. 1, the storage system 10 includes a host computer 12, a management computer 14, and a storage apparatus 16, wherein the host computer 12 and the storage apparatus 16 are connected via a data network 18, and the host computer 12, the management computer 14, and the storage apparatus 16 are connected via a management network 20.

The host computer 12 includes a memory 22, an input/output device 24, a processor 26, a physical disk 28, a communication interface (I/F) 30, and a management interface (I/F) 32, wherein the respective units are connected via a bus 34, the communication interface 30 is connected to the data network 18, and the management interface 32 is connected to the management network 20.

In the memory 22, multiple types of application programs, control programs, and others are stored. The input/output device 24 is composed of, for example, a mouse, a keyboard, and a display device. The processor 26 performs various types of processing in accordance with the control programs stored in the memory 22, issues commands in accordance with the respective application programs, and outputs read access or write access to the storage apparatus 16 via the communication interface 30.

The management computer 14 comprises a memory 36, an input/output device 38, a processor 40, a physical disk 42, and a management interface (I/F) 44, wherein the respective components are connected via a bus 46, and the management interface 44 is connected to the management network 20.

Figure 2:
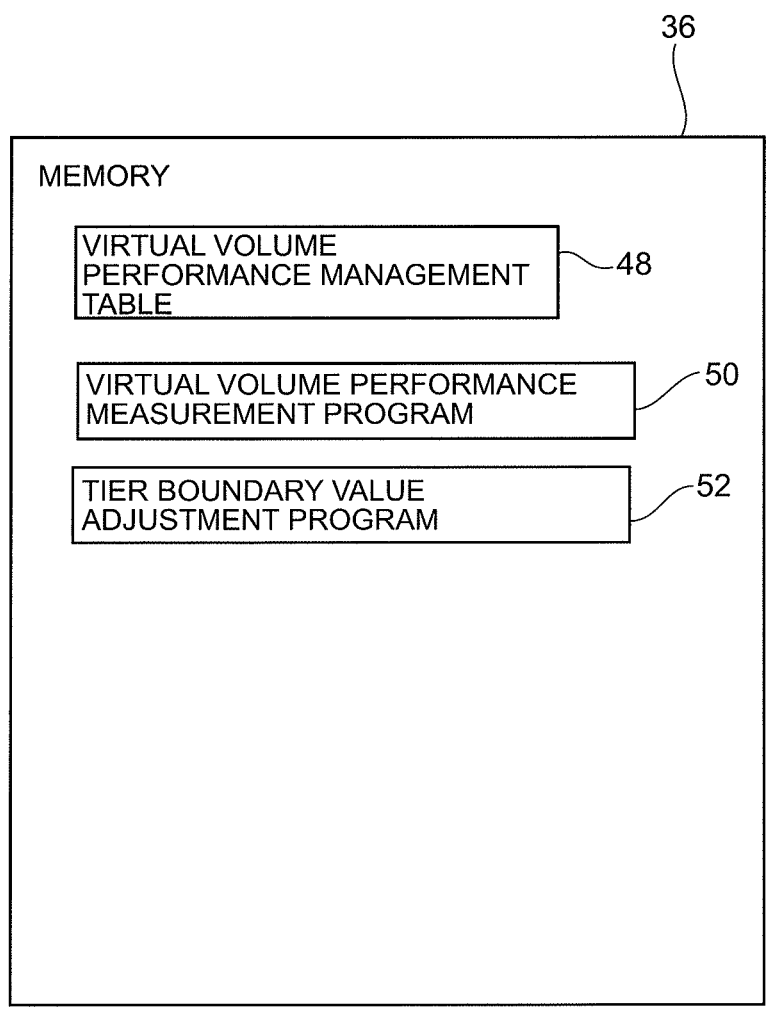
[FIG. 2]

In the memory 36, management programs are stored and, at the same time, as shown in FIG. 2, a virtual volume performance management table 48 for managing the performance of virtual volumes created in the storage apparatus 16, a virtual volume performance measurement program 50 for measuring the performance of the virtual volumes, and a Tier boundary value adjustment program 52 for adjusting a Tier boundary value set for each virtual volume are stored.

The processor 40 performs various types of processing in accordance with the respective programs stored in the memory 36, and outputs the processing result to the management network 20 via the management interface 44.

The storage apparatus 16 includes a controller 54 and a storage 56.

The controller 54 includes a communication interface (I/F) 58, a management interface (I/F) 60, a memory 62, a processor 64, and a media interface (I/F) 66, wherein the respective components are connected via a bus 68.

The storage 56 is configured as media (storage media) or storage devices and includes, as multiple types of storage devices having different performance, for example, response times, for example, multiple SSDs (Solid State Drives) 70 and multiple SATAs (Serial ATAs) 72. The SSDs 70 and the SATAs 72 are each connected to the media interface 66.

As media configuring the storage 56, media other than SSDs 70 and SATAs 72, for example, SASs (Serial Attached SCSIs), tapes, external connection volumes can also be used. Furthermore, the number of types of media is not limited to two and three or more types can also be used.

Furthermore, it is possible to configure a RAID group using the SSDs 70 and the SATAs 72, and it is also possible to set the SSDs 70 as a group of Tier 0 as a group having a response time faster than that of the SATAs 72 and set the SATAs 72 as a group of Tier 1 as a group having a response time slower than that of the SSDs 70. In this case, media of the same type but different RAID levels can be managed, as different Tiers, in multiple groups, and it is also possible to use the Tier of each group as a Tier for page compression.

Figure 3:
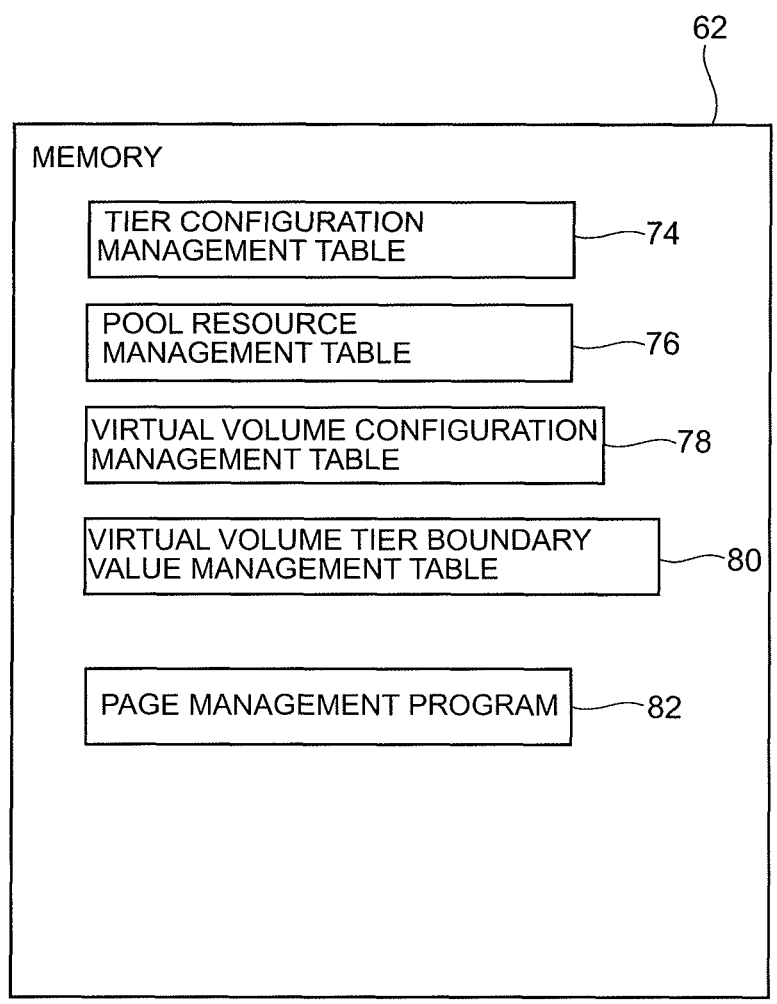
[FIG. 3]

In the memory 62 in the controller 54, as shown in FIG. 3, a Tier configuration management table 74, a pool resource management table 76, a virtual volume configuration management table 78, a virtual volume Tier boundary value management table 80, a page management program 82, control programs (not shown in the figure), and other tables and programs are stored.

The processor 64 transmits/receives information to/from the host computer 12 in accordance with the control programs stored in the memory 62, transmits/receives information to/from the management computer 14 and performs data read and data write processing for the SSDs 70 and the SATAs 72 via the media interface 66.

Figure 4:
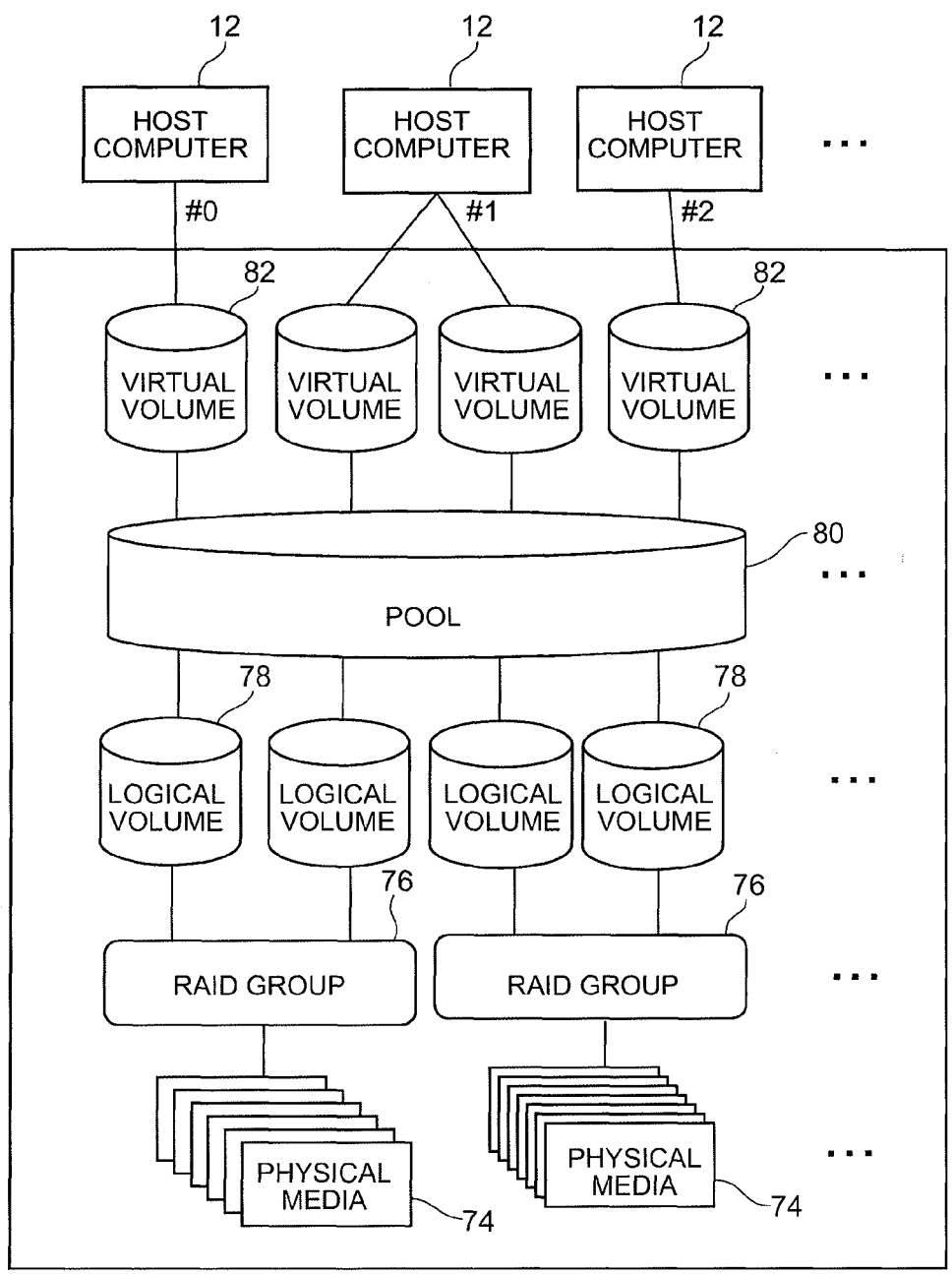
[FIG. 4]

Furthermore, in management of the storage 64, the processor 64 manages, as shown in FIG. 4, RAID groups 76—including multiple physical media 74 configured from SSDs 70 or SATAs 72—by dividing them into multiple separate groups, and allocates one or multiple logical volumes configuring the logical storage areas to the storage areas of the physical media 74 belonging to each RAID group 76, thereby managing the volumes.

In this case, the processor 64 manages each logical volume by establishing correspondences with the pages in the pool 80 in accordance with the page management program 82, manages each page in the pool 80 by establishing correspondences with the virtual volumes 82, and manages the respective virtual volumes 82 as the access targets for the host computers 12 of #0 to #n.

Figure 5:
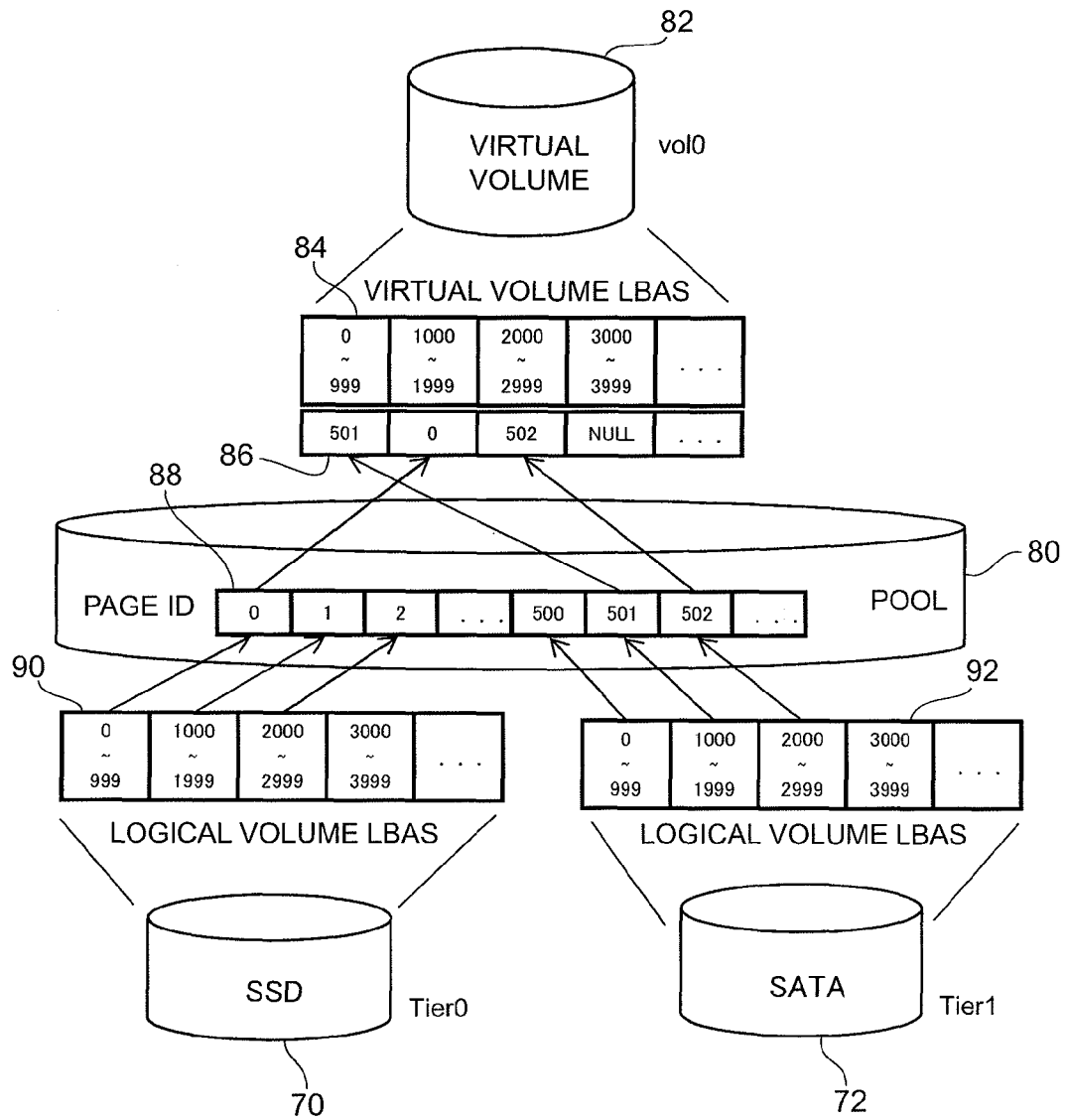
[FIG. 5]

Specifically described, as shown in FIG. 5, the virtual volume 82 includes a virtual storage area, and this virtual storage area is partitioned into multiple block groups 84 which are access targets for the respective access source host computers 12 or access targets for the various types of application programs stored in the memories 22 of the respective host computers 12. For each block group 84, a number 86 corresponding to a page ID is set. A block having a value as a number 86 indicates that a storage area has been allocated to the block. As more specifically described, a block group 84 having the value "502" as a number 86 has the LBAs "0~999" of the virtual volume 82 being set thereto while a block group 84 having the value "0" as a number 86 has the LBAs "1000~1999" of the virtual volume 82 being set thereto and a block group 84 having the value "502" as a number 86 has the LBAs "2000~2999" of the virtual volume 82 being set thereto. (A block group) having "NULL" as a number 86, i.e., a block group 84 configured from the LBAs "3000~3999" indicates (that it is a block group) having no storage area allocated thereto.

In the pool 80, multiple page IDs 88 are set and the page IDs 88 for the pool 80 are set corresponding to the numbers 86 of the virtual volumes 82. For example, the part whose value of the page ID 88 is "0" corresponds to the part whose value of the number 86 is "0" in the block group 84. To each page ID 88, a page 90 configured of a part of a logical volume created in the storage area of the SSD 70 belonging to the Tier 0 or a page 92 configured of a part of a logical volume created in the storage area of the SATA 72 belonging to the Tier 1 is made to correspond.

For example, the LBAs "0~999" in the logical volume created in the storage area of the SSD 70 are set to a page whose page ID 88 is #0. Meanwhile, the LBAs "1000~1999" in the logical volume created in the storage area of the SATA 72 are set to a page whose page ID 88 is #501. The LBAs "2000~2999" in the logical volume created in the storage area of the SATA 72 are set to a page whose page ID 88 is #502.

In this case, the processor 64 controls migration of the pages 90 and 92 of the respective virtual volume 82 and sets a Tier boundary value for each virtual volume 82 in accordance with the page management program 82. Furthermore, the processor 64 measures the access frequency (IOPS) per certain period of time for each page of each virtual volume 82 and, with reference to this measurement result, allocates a storage area from the logical volume created in the SSD 70 to a page whose access frequency (IOPS) per certain period of time is higher than the Tier boundary value set for each virtual volume 82 and, allocates a storage area from the logical volume created in the SATA 72 to a page whose access frequency (IOPS) per certain period of time is lower than the Tier boundary value set for each virtual volume 82. Note that, in some cases, only SSDs 70 or only SATAs 72 are allocated to each page of the virtual volume 82.

Meanwhile, the virtual volume performance management table 48, the virtual volume performance measurement program 50, and the Tier boundary value adjustment program 52 stored in the memory 36 of the management computer 14 can also be stored in the memory 62 of the controller 54 respectively. In this case, the processor 64, as described later, can also perform the processing in accordance with the virtual volume performance measurement program 50 and the Tier boundary value adjustment program 52, and the controller 54 is supposed to function as a controller which performs the processing in accordance with the virtual volume performance measurement program 50 and the Tier boundary value adjustment program 52.

Figure 6:
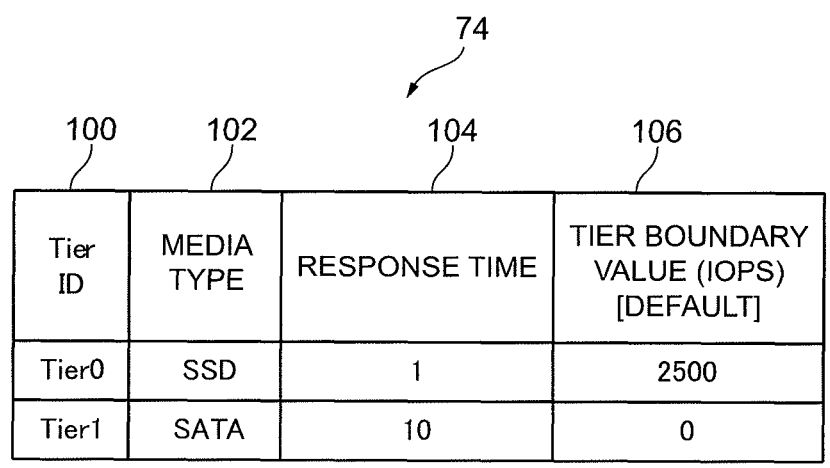
[FIG. 6]

Next, FIG. 6 shows the configuration of the Tier configuration management table 74 stored in the memory 62 of the storage apparatus 16.

In FIG. 6, the Tier configuration management table 74 is composed of a Tier ID field 100, a media type field 102, a response time field 104, and a Tier boundary value field 106. If the storage devices configuring the physical media 74 are divided, for example, into two groups or hierarchies Tier 0 and Tier 1 and the storage devices belonging to the Tier 0 are SSDs 70 while the storage devices belonging to the Tier 1 are SATAs 72, "Tier 0" and "Tier 1"—identifiers for identifying the physical media 74—are stored as entries in the Tier ID field 100. As entries in the media type field 102, types of media configuring the physical media 74, i.e., "SSD" is stored corresponding to "Tier 0" and "SATA" is stored corresponding to "Tier 1."

As entries in the response time field 104, [the values of] the response time corresponding to respective physical media 74, i.e., "1" is stored if the physical media 74 are "SSDs" while "10" is stored if the physical media 74 are "SATAs." As entries in the Tier boundary value field 106, reference values for sorting the physical media 74 into the Tier 0 or the Tier 1, i.e., the access frequency (IOPS) of each page per certain period of time is stored. For example, "2500" is stored corresponding to "SSDs" and "0" is stored corresponding to "SATAs."

Note that, regarding each entry in the Tier boundary value field 106, a preset value is stored as each entry if a performance requirement, as a Tier range of the pool 80, is set for each virtual volume 82, however, default is set for a virtual volume 82 for which no performance requirement is set.

In this case, the processor 64 measures the access frequency (IOPS) per certain period of time for each page of each virtual volume 82, refers to the Tier configuration management table 74 based on the measurement result, and allocates an SSD 70 if the access frequency (IOPS) per certain period of time is 2500 or higher and allocates a SATA 72 if the access frequency (IOPS) per certain period of time is lower than 2500.

Figure 7:
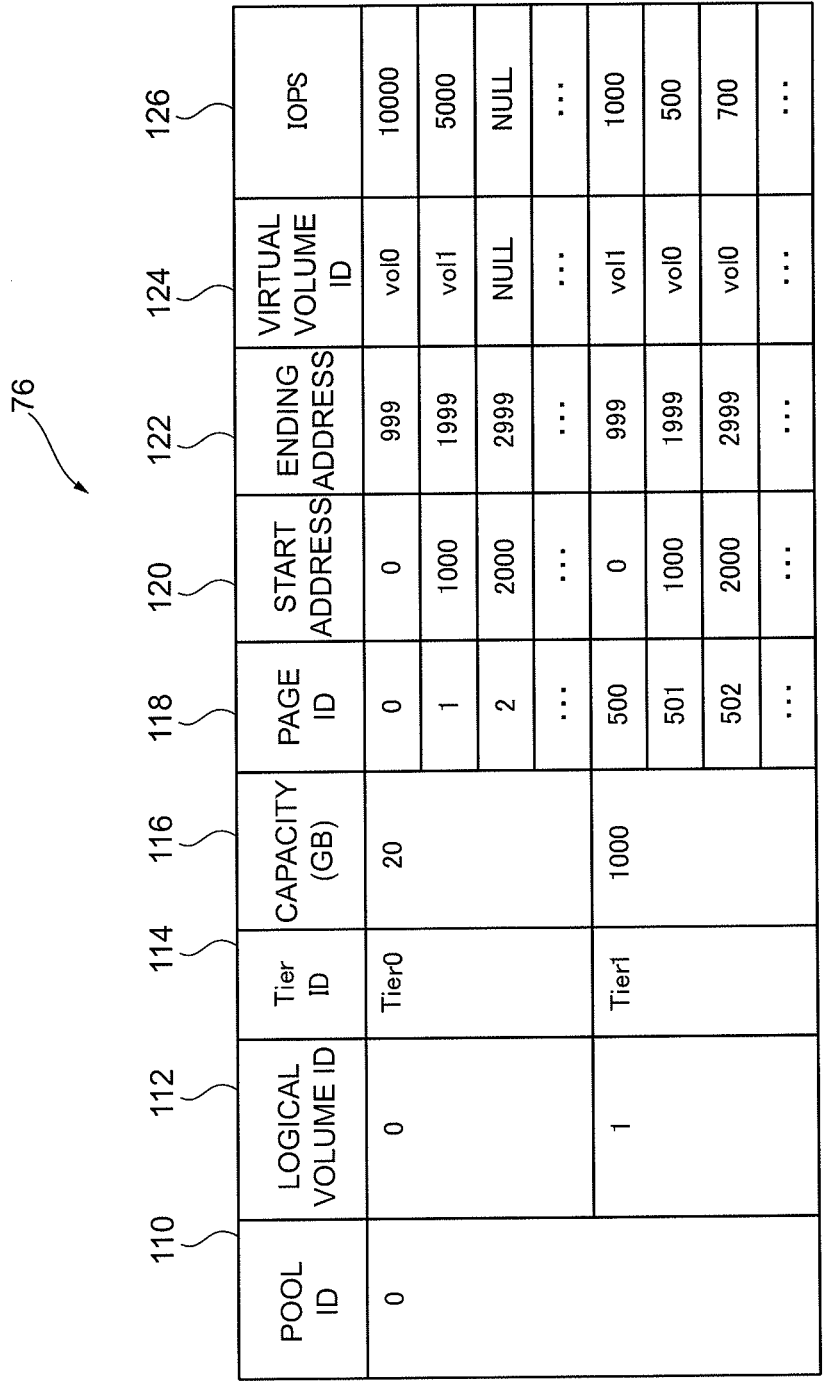
[FIG. 7]

Next, FIG. 7 shows the configuration of the pool resource management table 76 stored in the memory 62.

In FIG. 7, the pool resource management table 76 is composed of a pool ID field 110, a logical volume ID field 112, a Tier ID field 114, a capacity field 116, a page ID field 118, a start address field 120, an ending address field 122, a virtual volume ID field 124, and an IOPS field 126.

As entries in the pool ID field 110, identifiers for identifying pools 80, for example, if it is a pool 80 of #0, "0" is stored. As entries in the logical volume ID field 112, identifiers of the logical volumes belonging to the pool 80, for example, "0" is stored for the logical volume #0 and "1" is stored for the logical volume #1. As entries in the Tier ID field 114, identifiers for identifying the Tiers (hierarchies) to which the physical media 74 belong, for example, "Tier 0" is stored corresponding to the logical volume ID "0" while "Tier 1" is stored corresponding to the logical volume ID "1."

As entries in the capacity field 116, the capacity (GB) of the SSD 70 belonging to the "Tier 0"—"20"—is stored and the capacity (GB) of the SATA 72 belonging to the "Tier 1"—"1000"—is stored. As entries in the page ID field 118, identifiers for identifying the page IDs 88 in the pool 80, "0," "1," "2," . . . "500," "501," "502," . . . are stored. As entries in the start address field 120, for example, the start addresses of the pages belonging to the "Tier 0," "0," "1000," "2000," . . . are stored while, as entries in the ending address field 122, for example, the ending addresses of the pages belonging to the "Tier 0," "999," "1999," "2999," . . . are stored. That is, a page whose page ID 118 is "0" indicates that [the page is] configured from the storage area whose LBAs are "0~999."

As entries of the virtual volume ID field 124, the identifiers of the virtual volumes 82, "vol0," "vol1," and others are stored. It is indicated that the page belonging to the "Tier 0" whose page ID is "0" is allocated to the virtual volume whose virtual volume ID is "vol 0." Similarly, it is indicated that the page whose page ID is "500" belonging to the "Tier 1" is allocated to the virtual volume whose virtual volume ID is "vol1." Note that, for the page whose page ID is "2," which is not allocated to any virtual volume 82, "NULL" as being unallocated is stored.

As entries in the IOPS field 126, the values for the respective pages measured by the processor 64 are stored. For example, as an entry corresponding to "0" in the page ID field 118, the measured IOPS value, "10000," is stored.

Note that an address stored in each entry in the start address field 120 corresponds to a start address of a page 90 or a page 92, and an address stored in the ending address field 122 corresponds to an ending address of the page 90 or the page 92.

Next, FIG. 8 shows the configuration of the virtual volume configuration management table 78 stored in the memory 62.

In FIG. 8, the virtual volume configuration management table 78 is composed of a volume ID filed 130, a pool ID field 132, a start address field 134, an ending address field 136, an allocated page ID field 138, and a capacity field 140.

As entries in the volume ID filed 130, identifiers of the virtual volumes 82, for example, "vol0" is stored for the virtual volume 82 of #0 and "vol1" is stored for the virtual volume 82 of #1. As entries in the pool ID field 132, identifiers of the pools 80, for example, "0" for the pool 80 of #0, are stored. As entries in the start address field 134, for example, the LBAs of the virtual volume 82 of #0, i.e., the start addresses in the block groups 84, "0," "1000," "2000," . . . are stored. As entries in the ending address field 136, for example, as the LBAs of the virtual volume 82 of #0, the ending addresses in the block groups 84, "999," "1999," "2999," . . . are stored. As entries in the allocated page ID 138, the values corresponding to the page IDs 88 of the pool 80, for example, "501," "0," "502," . . . are stored. As entries in the capacity field 140, the capacities (GB) of the respective virtual volumes 82 the respective host computers 12 use when using each virtual volume 82, for example, "100" and "500" are stored.

Next, FIG. 9 shows the configuration of the virtual volume Tier boundary value management table 80 stored in the memory 62.

In FIG. 9, the virtual volume Tier boundary value management table 80 is composed of a virtual volume ID field 150, a Tier ID field 152, and a Tier boundary value field 154.

As entries in the virtual volume ID field 150, identifiers of the virtual volumes 82, i.e., "vol0" is stored for the virtual volume 82 of #0 and "vol1" is stored for the virtual volume 82 of #1. As entries in the Tier ID field 152, identifiers for identifying the Tiers (hierarchies) of the physical media 74 belonging to the respective virtual volumes 82, "Tier 0" and "Tier 1" are stored. Note that the SSDs 70 are included as physical media 74 in the Tier 0 and that the SATAs 72 are included as physical media 74 in the Tier 1.

As entries in the Tier boundary value field 154, the Tier boundary values set for the respective virtual volumes 82—reference values for sorting the physical media 74 into the Tier 0 or the Tier 1—are stored in the form of access frequencies (IOPS) per certain period of time. For example, 2400 is stored for the "Tier 0" belonging to the virtual volume 82 of #0. Note that, if default is stored in the Tier boundary value field 154, a value stored in the entry in the Tier boundary value field 106 in the Tier configuration management table 74 shown in FIG. 6 is stored as a Tier boundary value.

Next, FIG. 10 shows the configuration of the virtual volume performance management table 48 stored in the memory 36 in the management computer 14.

In FIG. 10, the virtual volume performance management table 48 is composed of a virtual volume ID field 160, a response time field 162, a performance requirement field 164, and a priority field 166.

As entries in the virtual volume ID field 160, identifiers of the virtual volumes 82, for example, "vol0" is stored for the virtual volume 82 of #0 and "vol1" is stored for the virtual volume 82 of #1. As entries in the response time field 162, measured values (current values) of the respective virtual volumes 82, i.e., average response times per I/O of the respective virtual volumes 82 are registered.

As entries in the performance requirement field 164, if a performance requirement is set for a virtual volume 82 and if, for example, a response time is designated as the performance requirement, the values of the response time are stored. For example, as for the virtual volume 82 of #0, information indicating that the performance requirement for the response time is 5 or smaller is stored while, as for the virtual volume of #1, the information indicating that the performance requirement for the response time is 15 or smaller is stored.

That is, if a value (measured value) of the response time registered as an entry in the response time field 162 (for a virtual volume 82) is equal to or smaller than a value registered as an entry in the performance requirement field 164, it means that the virtual volume 82 satisfies the performance requirement. Meanwhile, the value (measured value) of the response time registered as an entry in the response time field 162 (for a virtual volume 82) is larger than the value set by the performance requirement, it means that the virtual volume 82 does not satisfy the performance requirement.

As entries in the priority field 166, values of priority for adjusting the Tier boundary values are stored corresponding to the respective virtual volumes 82. For example, as entries in the priority field 166, "10" is stored as an entry corresponding to the virtual volume 82 of #0 and "3" is stored as an entry corresponding to the virtual volume 82 of #1. In this case, larger numbers indicate higher priority. Note that, besides using numbers, characters may also be used as priority; "high" for hight priority and "low" for low priority.

Figure 11:
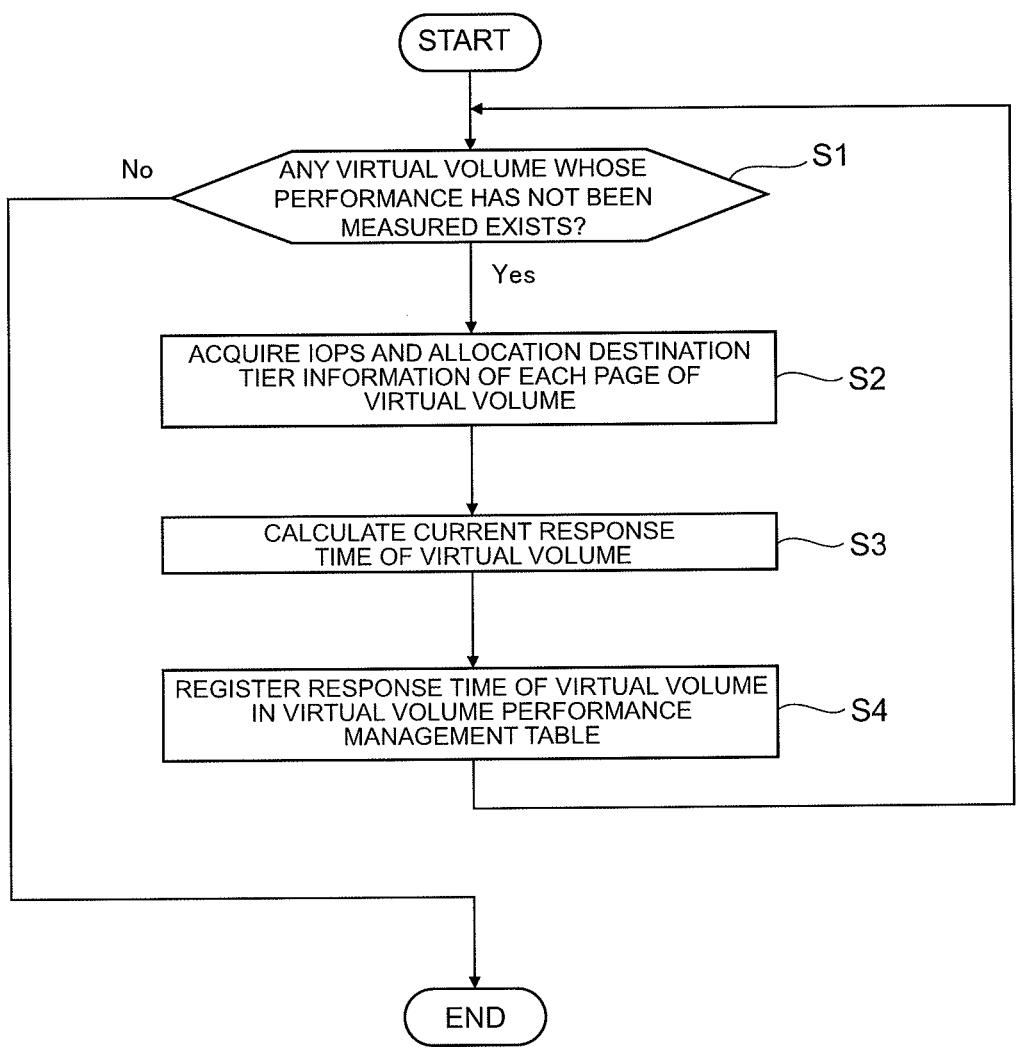
[FIG. 11]

Next, processing performed using the virtual volume performance measurement program 50 is described in accordance with the flowchart in FIG. 11.

The processor 40 in the management computer 14 starts the processing using the virtual volume performance measurement program 50 stored in the memory 36, and firstly determines whether or not performance measurement is complete for all the virtual volumes 82, that is, whether or not there are any virtual volumes 82 for which performance measurement has not been performed yet (S1). Here, if the processor 40 determines that the performance measurement is complete for all the virtual volumes 82, it terminates the processing of this routine, on the other hand, if it determines that there are virtual volumes 82 for which the performance measurement has not been performed yet, it performs processing for acquiring information related to the non-measured virtual volumes 82 from the storage apparatus 16 via the management network 20 (S2).

That is, the processor 40 acquires an IOPS and allocation destination Tier information of each page in the non-measured virtual volumes 82. As more specifically described, the processor 40 acquires, as the IOPS of the respective pages in the virtual volumes 82, information related to the numeric values (measured values) of the IOPS stored in the IOPS field 126 of the pool resource management table 76 shown in FIG. 7, also acquires information stored in the Tier configuration management table 74 shown in FIG. 6 (such as the response times of the storage devices belonging to the Tiers 0, 1), and saves the respective pieces of the acquired information as histories in the physical disk 42. The processor 40 may also saves the respective pieces of the acquired information in the memory 36.

Next, the processor 40 calculates the current response time of each of the virtual volumes 82 in accordance with the expression (1) shown below (S3), registers the calculation result in the virtual volume performance management table 48 (refer to FIG. 10) corresponding to the respective virtual volumes 82 (S4), and repeats the processing of the steps from S1 to S4.

In this case, the processor 40 determines whether or not each of the virtual volumes 82 satisfies the performance requirement by comparing the response time registered in the virtual volume performance management table 48 shown in FIG. 10 with the response time of the performance requirement.

[Math. 1]

$$RT_{vvol} = \frac{r_{SATA} \times IOPS_{SATA} + r_{SSD} \times IOPS_{SSD}}{IOPS_{vvol}} \quad (1)$$

$RT_{vvol}$: response time of virtual volume
$r_{SATA}$: Response time of SATA (response time shown in FIG. 6=10)
$r_{SSD}$: Response time of SSD (response time shown in FIG. 6=1)
$IOPS_{SATA}$: Total IOPS for SATAs
$IOPS_{SSD}$: Total IOPS for SSDs
$IOPS_{vvol}$: Total IOPS for virtual volume
(=$IOPS_{SATA}$+$IOPS_{SSD}$)

Figure 12:
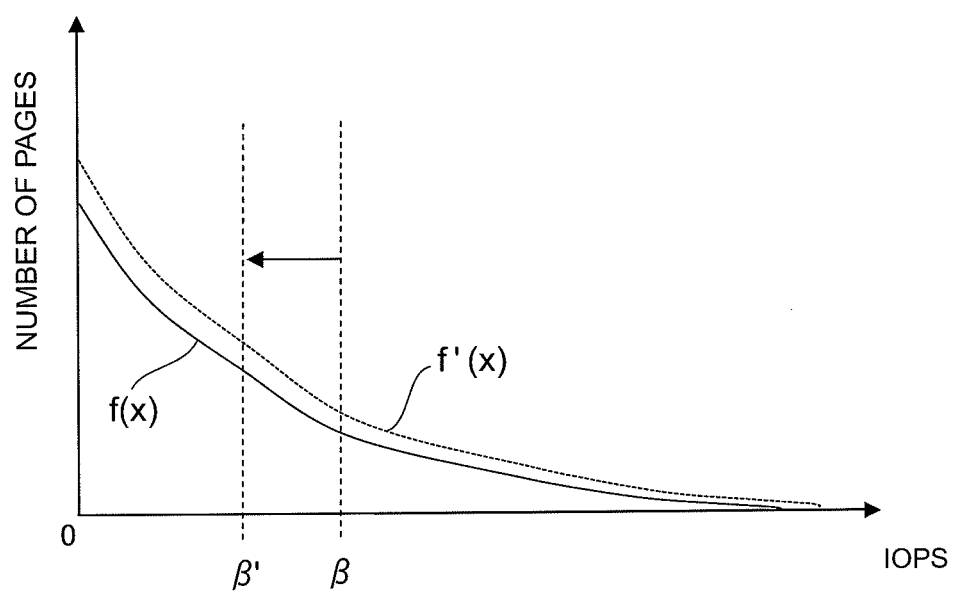
[FIG. 12]

In this case, if, for example, β has been set as a Tier boundary value of a virtual volume 82 as shown in FIG. 12, the processor 40 uses the expressions (2) to (4) shown below when calculating a response time in accordance with the expression (1).

[Math. 2]

$$IOPS_{SATA} = \sum_{x=0}^{\beta} xf(x) \quad (2)$$

[Math. 3]

$$IOPS_{SSD} = \sum_{x=\beta} xf(x) \quad (3)$$

[Math. 4]

$$IOPS_{vvol} = \sum_{x=0} xf(x) \quad (4)$$

x: IOPS (x=0, 1, 2, . . . , maximum IOPS of the pages in the virtual volume 82)
f(x): number of pages per IOPS (there are f(x) number of pages whose IOPS=x)

β: Tier boundary value (0≤β≤maximum IOPS of the pages in the virtual volume 82)

Figure 13:
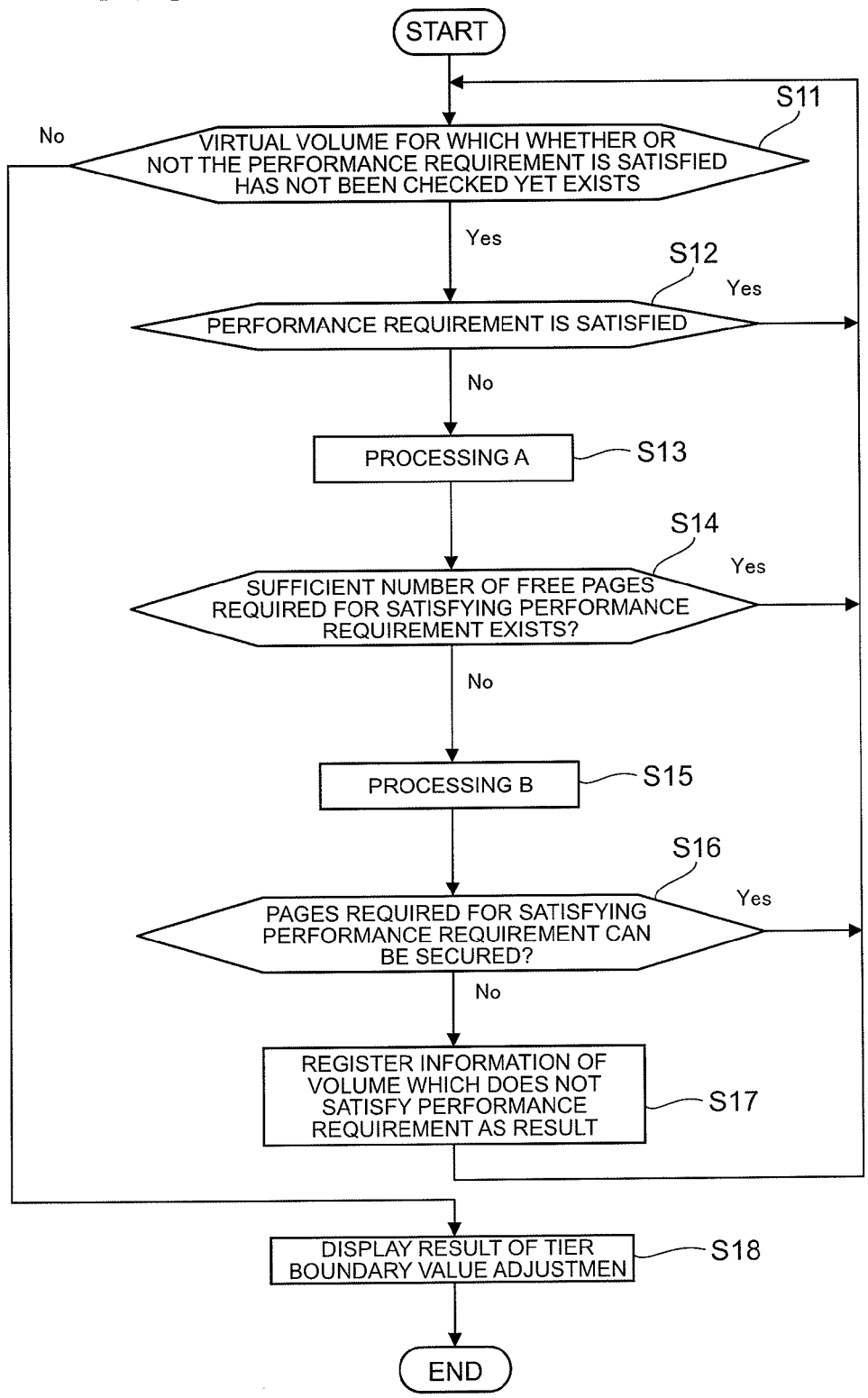
[FIG. 13]

Next, the processing by the Tier boundary value adjustment program 52 is described in accordance with the flowchart in FIG. 13.

The processor 40 in the management computer 14 starts the processing by starting the Tier boundary value adjustment program 52 stored in the memory 36, and determines whether or not there is any virtual volume 82 that has not been checked whether it satisfies the performance requirement (S11). Here, if all the virtual volumes 82 have been checked, the processor 40 proceeds to the processing at the step S18, on the other hand, if there is any virtual volume 82 that has not been checked, refers to the virtual volume performance management table 48 shown in FIG. 10 with reference to the response time calculated by using the expression (1), and determines whether or not the virtual volume satisfies the performance requirement (S12).

If determining that [the virtual volume] satisfies the performance requirement, the processor 40 returns to the processing at the step S11 to check other virtual volumes 82, on the other hand, if determining that [the virtual volume] does not satisfy the performance requirement, proceeds to the step S13 and performs processing, as the processing A, for calculating the number of pages satisfying the performance requirement (S13).

Figure 14:
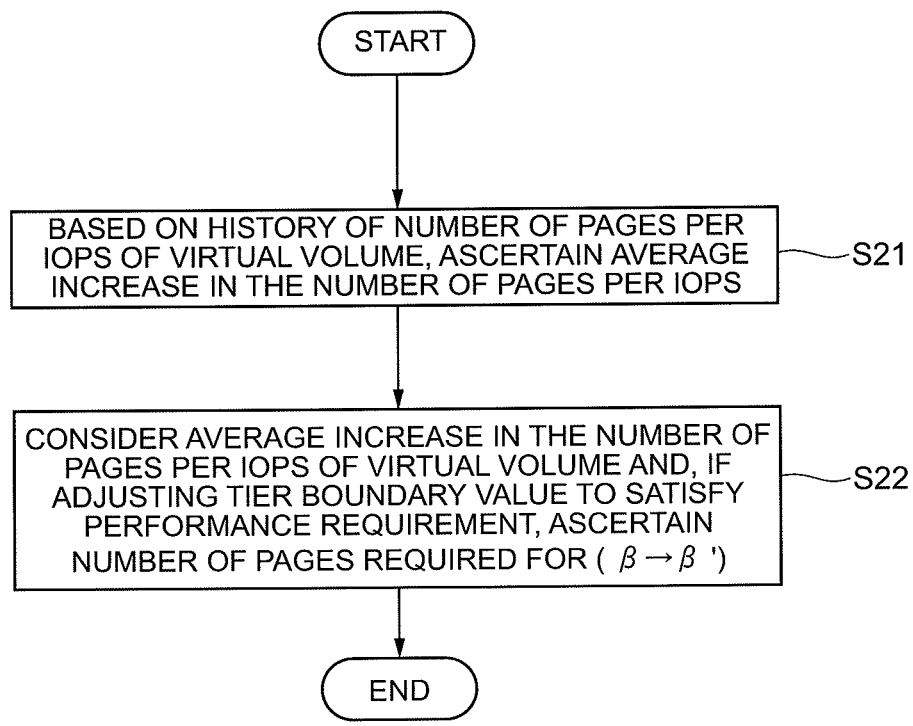
[FIG. 14]

Next, the content of the processing A at the step S13 is described in accordance with the flowchart in FIG. 14.

Firstly, the processor 40 calculates an average increase in the number of pages for each IOPS based on the histories of the number of pages of each IOPS of the virtual volumes 82 (the information acquired at the step S2 in FIG. 11) (S21).

For example, as shown in FIG. 12, for a virtual volume 82 for which β has been set as a Tier boundary value, when a function indicating the characteristic of the current number of pages of each IOPS of the virtual volume 82 is f(x), [the processor 40] calculates a predicted value—a value that is predicted to increase—using and according to f'(x) as a function indicating the characteristic of the number of pages of each IOPS of the virtual volume 82 considering the average increase in the number of pages.

Next, in view of the average increase in the number of pages of each IOPS of the virtual volume 82, if adjusting the Tier boundary value so that it satisfies the performance requirement, the processor 40 calculates the number of pages whose Tier boundary value, for example, β must be changed to the Tier boundary value β' (S22), and completes the processing of this routine.

In this case, the processor 40 calculates the number of pages using the expressions from (5) to (10) shown below.

[Math. 5]
$$RT_{req} \geq \frac{r_{SATA} \times (IOPS'_{SATA} - D) + r_{SSD} \times (IOPS'_{SSD} + D)}{IOPS'_{vvol}} \quad (5)$$

[Math. 6]
$$D \leq \frac{RT_{req} \times IOPS'_{vvol} - (r_{SATA} \times IOPS'_{SATA} + r_{SSD} \times IOPS'_{SSD})}{r_{SSD} - r_{SATA}} \quad (6)$$

[Math. 7]
$$D = \sum_{x=\beta'}^{\beta} xf'(x) \quad (7)$$

[Math. 8]
$$IOPS'_{SATA} = \sum_{x=0}^{\beta} xf'(x) \quad (8)$$

[Math. 9]
$$IOPS'_{SSD} = \sum_{x=\beta}^{} xf'(x) \quad (9)$$

[Math. 10]
$$IOPS'_{vvol} = \sum_{x=0}^{} xf'(x) \quad (10)$$

$RT_{req}$: Response time set by the performance requirement (response time set by the performance requirement in FIG. 10=5 or 15).

D: The number of IOs (IOPS) which should be migrated from the SATA to the SSD for satisfying the performance requirement.

The steps from S21 to S22 are the processing performed when, for example, for a virtual volume 82 for which the Tier boundary value β has been set, if the number of accesses to the virtual volume 82 per unit of time is larger than the Tier boundary value β, SSDs 70—as highly-reliable storage devices—whose access time is faster than SATAs 72 are allocated, and if the number of accesses per unit of time to the virtual volume 82 for which the Tier boundary value β has been set is smaller than the Tier boundary value β, SATAs 72—as low-cost storage devices—are allocated, and in these steps, the following is considered.

Specifically, there are cases in which the number of accesses to the virtual volume 82 for which the Tier boundary value β increases, especially the number of accesses to the pages to which SSDs 70 are allocated increases, and unless the number of pages to which SSDs 70 are allocated is increased, the response time of the virtual volume 82 for which the Tier boundary value β has been set degrades, and the virtual volume 82 for which the Tier boundary value β has been set no longer satisfies the performance requirement.

Therefore, for the virtual volume 82 for which the Tier boundary value β has been set, [the processor 40] calculates an average increase in the number of pages for each IOPS with reference to the histories of the number of pages of each IOPS. For example, [the processor 40] calculates an increase in the number of pages for the IOPS "0," "1," "2," "3," ... respectively, and, calculates an average increase in the number of pages for each IOPS based on the respective calculation results.

Next, in view of the average increase in the number of pages of each IOPS, [the processor 40] adjusts, for the virtual volume 82 for which the Tier boundary value β has been set, the Tier boundary value β to the Tier boundary value β' so that the performance requirement is satisfied, and calculates the number of pages after the adjustment.

For the virtual volume 82 for which the Tier boundary value β has been set, if there is a shortage of, for example, 10 pages as the pages to which SSDs 70 should be allocated with reference to the average increase in the number of pages for each IOPS, [the processor 40] adjusts the Tier boundary value β to the Tier boundary value β' to increase the number of pages to which SSDs 70 should be allocated and reduce the number of pages to which SATAs 72 should be allocated, and calculates the number of pages after the adjustment.

Here, considering that the number of accesses to the virtual volume 82 for which the Tier boundary value β has been set will increase, as shown in FIG. 12, [the processor 40] uses the function f'(x) indicating the predicted value as the function determined by the number of pages and the IOPS.

In this case, for example, for the virtual volume 82 for which the Tier boundary value β has been set, if there is a shortage of 10 pages as the pages to which SSDs 70 should be allocated with reference to the average increase in the number of pages of each IOPS and when the number of pages calculated after adjusting the Tier boundary value β to the Tier boundary value β' is 15 pages, it is predicted that there will be a shortage of 15 pages in the future.

That is, by adjusting the Tier boundary value β of the virtual volume 82 for which the Tier boundary value β has been set to the Tier boundary value β' and thereby increasing the number of pages to be allocated from SSDs 70 to the virtual volume 82 by 15 pages, the performance requirement will be satisfied. Therefore, it is necessary to secure the number of pages required for the increase of 15 pages. For this reason, as described below, processing for securing the number of pages required for the increase of 15 pages is performed.

Next, proceeding to the step S14 in FIG. 13, the processor 40 determines, as processing after calculation of the number of pages for satisfying the performance requirement, whether or not the virtual volume 82 whose Tier boundary value has been adjusted to, for example, the Tier boundary value β' has the number of free pages required for satisfying the performance requirement (S14).

For example, the processor 40 determines whether or not the virtual volume 82 whose Tier boundary value has been adjusted to the Tier boundary value β' has the number of free pages corresponding to 15 pages, as the pages to which SSDs 70 should be allocated. That is, if the number of free pages corresponding to 15 pages are required as the pages to which SSDs 70 should be allocated, the processor 40 determines, assuming that 15 pages as the number of pages to add, whether or not any of the virtual volumes 82 includes the same or a larger number of unallocated pages as/than the number of pages to add.

If the same or a larger number of unallocated pages as/than the number of pages to add exists in any of the virtual volumes 82, the processor 64 in the controller 54 is supposed to, with reference to the determination result of the processor 40, allocate the pages equivalent to the number of pages to add to the virtual volume 82 where the same or a larger number of unallocated pages as/than the number of pages to add exists.

If determining that there are free pages, the processor 40 returns to the processing at the step S11 for performing the processing related to the other virtual volumes 82, on the other hand, if determining that there are no free pages necessary for satisfying the performance requirement, it performs, in order to allocate the pages allocated to the other virtual volumes 82 to another virtual volume 82, for example, the virtual volume 82 whose Tier boundary value has been adjusted to the Tier boundary value β', the processing—processing B—for calculating the number of pages for satisfying the performance requirement (S15).

Figure 15:
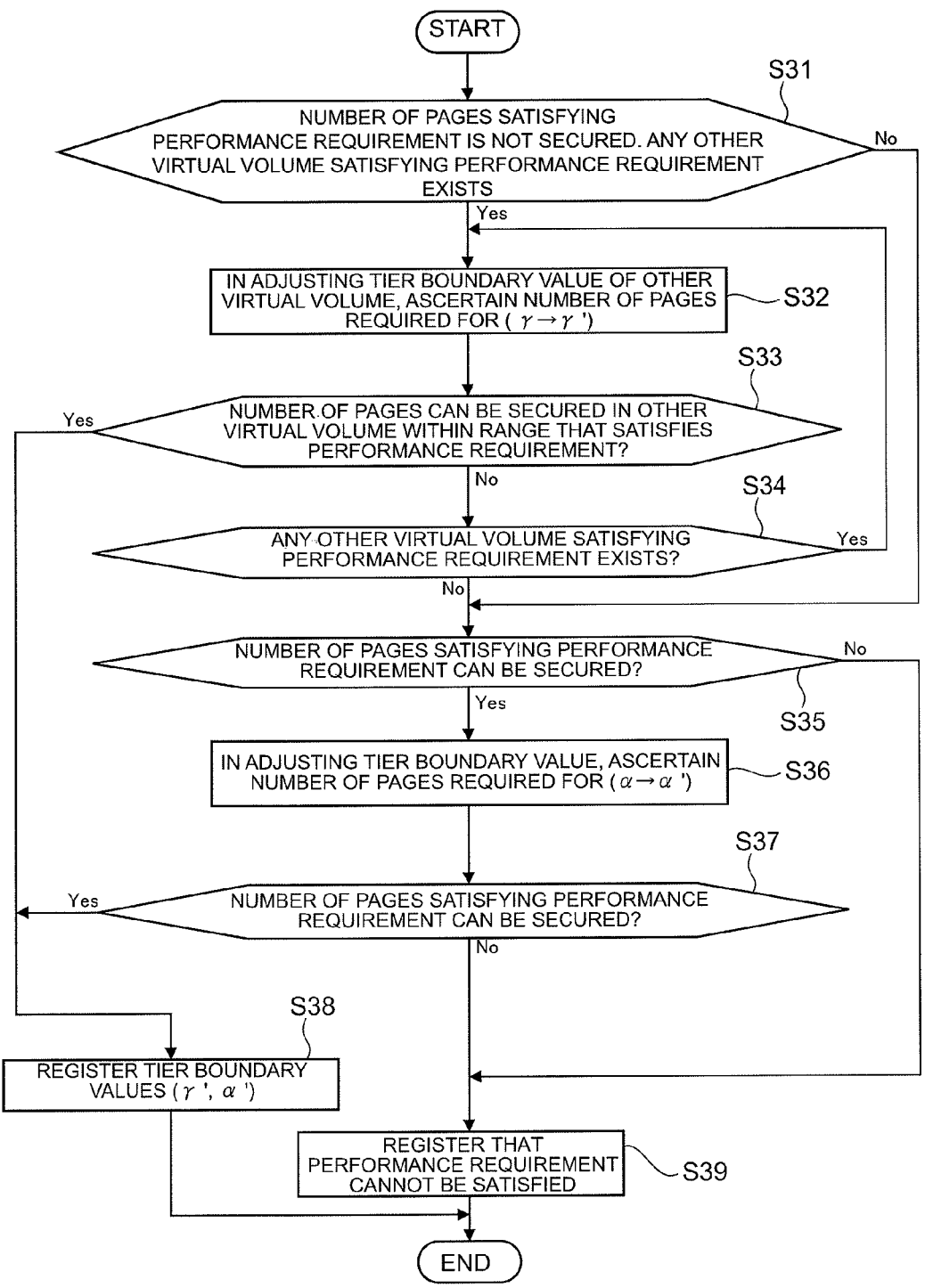
[FIG. 15]

Next, the content of the processing B is described in accordance with the flowchart in FIG. 15.

Firstly, if determining that the number of pages satisfying the performance requirement cannot be secured from, for example, the virtual volume 82 whose Tier boundary value has been adjusted to the Tier boundary value β', the processor 40 refers to the performance requirement in the virtual volume performance management table 48 in FIG. 10 for other virtual volumes 82, determines whether or not there is any other virtual volume 82 satisfying the performance requirement (S31) and, if determining that there is another virtual volume 82 satisfying the performance requirement, adjusts the Tier boundary values of the other virtual volume 82 and calculates a number of required pages (S32).

Figure 16:
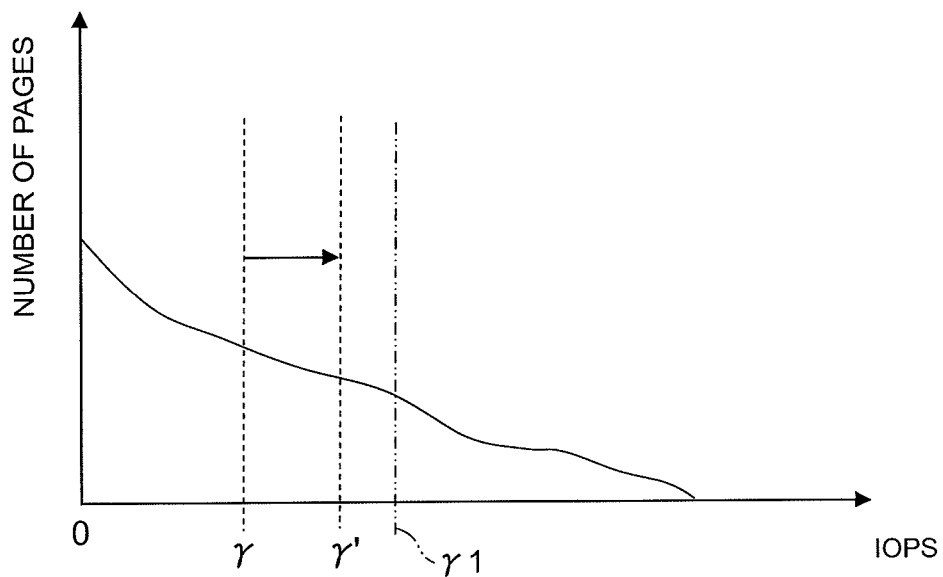
[FIG. 16]

For example, if the virtual volume 82 for which the Tier boundary value γ has been set as a Tier boundary value satisfies the performance requirement, as shown in FIG. 16, [the processor 40] calculates, for the virtual volume 82 for which the Tier boundary value γ has been set, a number of pages at the time when the Tier boundary value γ is adjusted to the Tier boundary value γ' which is a value equal to or smaller than the upper limit value γ1 of the Tier boundary value and is in the range satisfying the performance requirement.

As more specifically described, as shown in FIG. 12, when assuming the number of pages to add after adjusting the Tier boundary value β to the Tier boundary value β' to be 15 pages, [the processor 40,] calculates a Tier boundary value γ' for satisfying the performance requirement even if the number of pages is reduced by the number of pages to add. That is, for the virtual volume 82 for which the Tier boundary value γ has been set, [the processor 40] calculates a Tier boundary value γ' that satisfies the performance requirement set as the response time even if the number of pages allocated to the SSDs 70 is reduced by 15 pages and the number of pages allocated to the SATAs 72 is increased by 15 pages. Then, [the processor 40] calculates a number of pages at the time when the Tier boundary value γ has been adjusted to the Tier boundary value γ'.

After this, the processor 40 determines whether or not the number of pages can be secured in the other virtual volume 82 in a range which satisfies the performance requirement (S33).

If determining that the pages are secured in the virtual volume 82 for which the Tier boundary value γ has been adjusted to the Tier boundary value γ' in the range which satisfies the performance requirement, the processor 40 proceeds to the processing at the step S38.

In this case, for example, if the number of pages secured, in the range which satisfies the performance requirement, in the virtual volume 82 for which the Tier boundary value γ has been adjusted to the Tier boundary value γ' is 15 pages or larger, the processor 40 notifies, to the processor 64 in the controller 54, that the 15 or more pages are secured in the virtual volume 82 for which the Tier boundary value has been adjusted to the Tier boundary value γ'.

The processor 64 then performs processing for making the virtual volume 82 for which the Tier boundary value has been adjusted to the Tier boundary value γ' release 15 pages, which are the pages to which SSDs 70 are allocated and processing for allocating 15 pages which are the pages to which SSDs 70 are allocated to the virtual volume 82 for which the Tier boundary value has been adjusted to the Tier boundary value β'.

Meanwhile, if the pages cannot be secured in the virtual volume 82 for which the Tier boundary value γ has been adjusted to the Tier boundary value γ', in the range which satisfies the performance requirement, the processor 40 determines, by referring to the performance requirements of other virtual volumes 82 in the virtual volume performance management table 48 shown in FIG. 10, whether or not there is any other virtual volume 82 satisfying the performance requirement (S34).

Here, if determining that, among the other virtual volumes 82, there is a virtual volume 82 satisfying the performance requirement, the processor 40 returns to the processing at the step S32 and repeats the processing from the steps from S32 to S34, on the other hand, if determining that there is no virtual volume 82 satisfying the performance requirement, determines whether or not there is, among the virtual volumes 82 for which no performance requirement i.e. no response time is specified, any virtual volume 82 from which the virtual volume 82 for which the Tier boundary value has been adjusted to the Tier boundary values β' can secure the number of pages (15 pages) satisfying the performance requirement (S35).

For example, if there is a virtual volume 82 for which no response time is specified as a performance requirement and a Tier boundary value has been set to the Tier boundary value α, the processor 40 determines whether or not the virtual volume 82 for which the Tier boundary value has been adjusted to the Tier boundary value β' can secure the number of pages (15 pages) satisfying the performance requirement, in the virtual volume 82 for which the Tier boundary value α has been set.

If determining that [the pages] are not secured, the processor 40 proceeds to the processing at the step S39, meanwhile, if determining that [the pages] are secured, ascertains the number of pages required for adjusting, in the virtual volume 82 for which the Tier boundary value α has been set, the Tier boundary value α to the Tier boundary value α' (S36).

Figure 17:
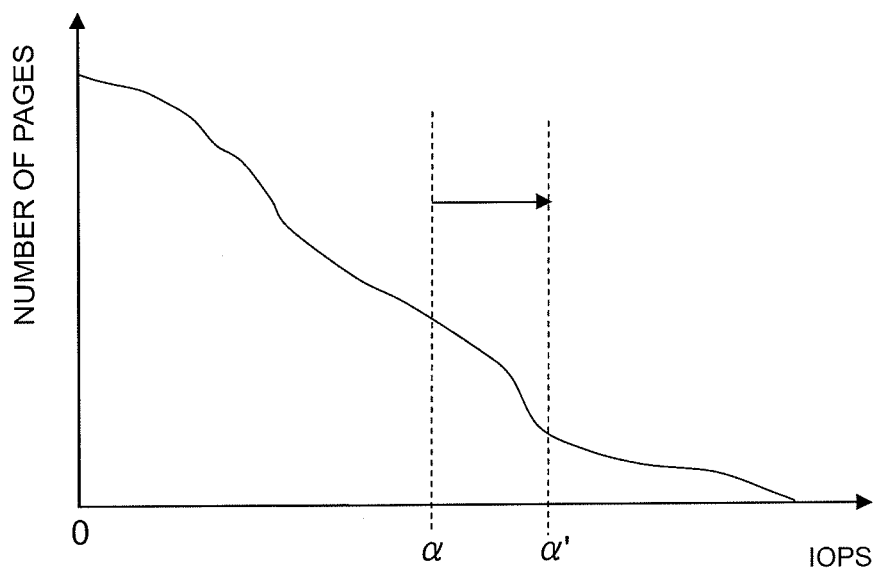
[FIG. 17]

For example, for reducing the number of pages allocated from the SSDs 70 and increasing the number of pages allocated from the SATAs 72, as shown in FIG. 17, [the processor 40] calculates the number of pages at the time when the Tier boundary value α has been adjusted to the Tier boundary value α'.

After this, the processor 40 adjusts the Tier boundary value from the Tier boundary value α to the Tier boundary value α' and determines whether the virtual volume 82 for which the Tier boundary value has been adjusted to the Tier boundary value β' can secure the number of pages (15 pages) satisfying the performance requirement in the virtual volume 82 for which the Tier boundary value has been adjusted to the Tier boundary value α' (S37).

If [the pages are] secured, for example, if 15 or more pages are secured in the virtual volume 82 for which the Tier boundary value has been adjusted from the Tier boundary value α to the Tier boundary value α', the processor 40 proceeds to the step S38, registers the Tier boundary value γ' and the Tier boundary value α' used in the processing at the step S32 and the step S36 to the physical disks 42 as the adjusted Tier boundary values respectively, also displays the same on the screen of the input/output device 38, and completes the processing of this routine.

After that, the processor 64 in the controller 54 performs processing for making the virtual volume 82 for which the Tier boundary value has been adjusted to the Tier boundary value α' release the 15 pages which are the pages to which the SSDs 70 are allocated; and performs processing for allocating the 15 pages—pages to which the SSDs 70 are allocated—to the virtual volume 82 for which the Tier boundary value has been adjusted to the Tier boundary value β'.

Meanwhile, at the step S37, if determining that the virtual volume 82 for which the Tier boundary value has been adjusted to the Tier boundary value β' cannot secure the number of pages (15 pages) satisfying the performance requirement, the processor 40 registers, in the physical disk 42, that the virtual volume 82 for which the Tier boundary value has been adjusted to the Tier boundary value β' does not satisfy the performance requirement (S39), completes the processing of this routine, and proceeds to the processing at the step S16 in FIG. 13.

At the step S16 in FIG. 13, the processor 40 determines whether or not the pages required for satisfying the performance requirement can be secured and, if the required pages can be secured, returns to the processing at the step S11, meanwhile, if determining that the required pages cannot be secured, registers the information related to the virtual volume 82 that does not satisfy the performance requirement as the processing result (S17), returns to the processing at the step S11, and repeats the processing from the step S11 to the step S17.

Meanwhile, at the step S11 in FIG. 13, if the check as to whether a performance requirement is satisfied or not is complete for all the virtual volumes 82, the processor 40 performs processing for displaying the results of the Tier boundary value adjustment (S18), displays the adjusted Tier boundary values β', γ', and α' on the screen of the input/output device 38 respectively, displays also the content of, among the post Tier range adjustment virtual volumes 82, the virtual volumes 82 that cannot satisfy the performance requirement on the screen of the input/output device 38, and completes the processing of this routine.

Next, FIG. 18 shows an example display of the display screen 380, related to the virtual volumes 82 that do not satisfy the performance requirements. On the display screen 380 of the input/output device 38, pieces of information related to volume IDs 382, response times 384, performance requirements 386, and capacity shortfalls 388 are shown.

In the volume ID 382, the identifiers of the virtual volumes 82 that do not satisfy the performance requirements, for example, "vol6" for the virtual volume 82 of #6 and "vol11" for the virtual volume 82 of #11, are shown. In the response time 384, the response times related to the virtual volumes 82 that do not satisfy the performance requirements—"15 ms" and "20 ms"—are shown. In the performance requirement 386, response times (10, 15) set by the performance requirements are shown and the values of the response times that do not satisfy the performance requirements are shown. In the capacity shortfall 388, the values of capacity shortfalls related to the virtual volumes 82 that do not satisfy the performance requirements, that is, the values of additional capacities required for satisfying the performance requirements, for example, "0.5 GB" and "1.0 GB" are shown.

Figure 19:
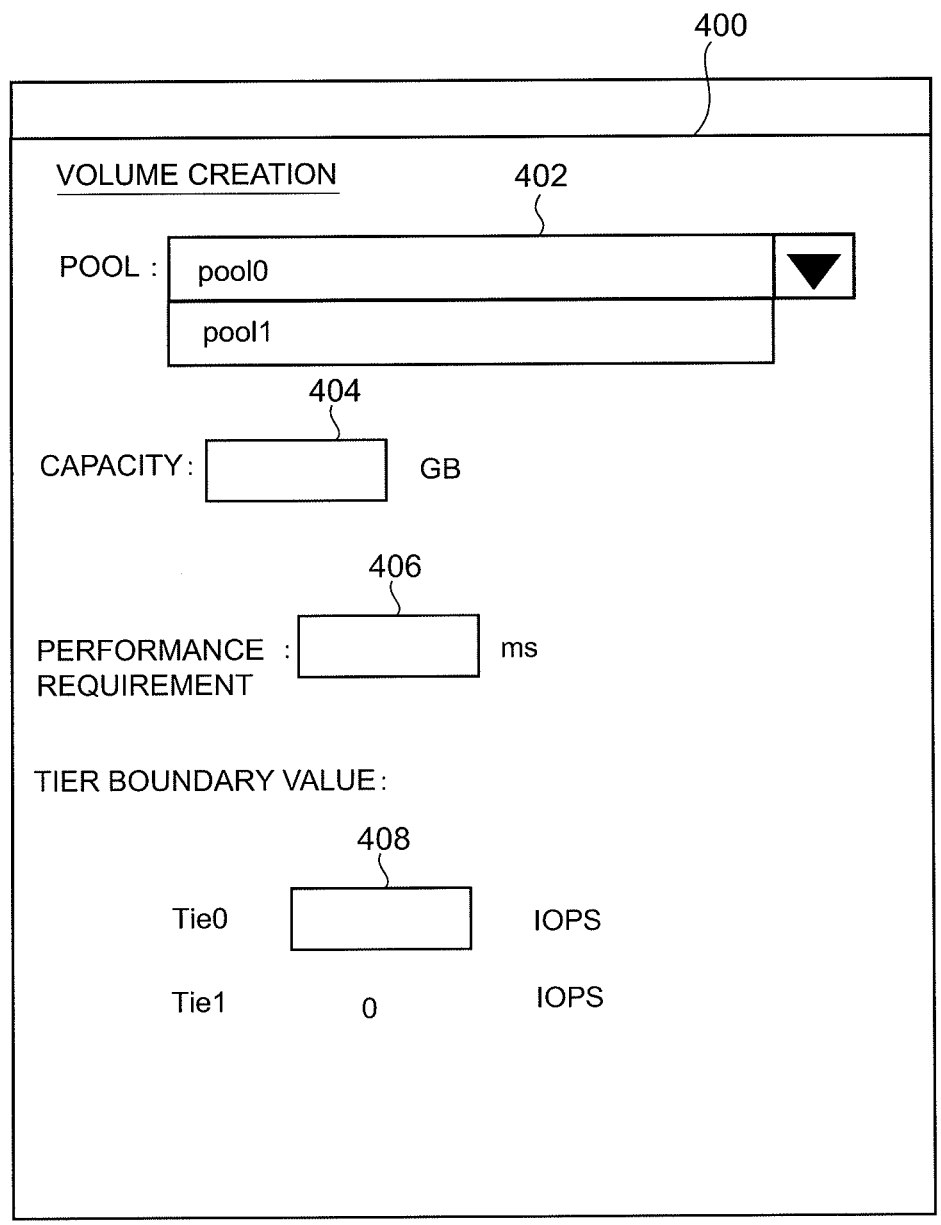
[FIG. 19]

Next, an example display of the virtual volume creation screen is shown in FIG. 19.

The user's virtual volume creation screen 400 includes, for use by the user when creating a virtual volume 82, a pool selection area 402 for selecting a pool 80, a capacity insertion area 404 for specifying a capacity for creating a virtual volume 82, a performance requirement specification area 406 for specifying a performance requirement, and a Tier boundary value specification area 408 for specifying a Tier boundary value. Note that specification to the performance requirement specification area 406 and the specification for the Tier boundary value specification area 408 is not mandatory and default is set if the user does not make any input to those areas.

According to this embodiment, multiple pages 90, 92—access targets for the access request source host computers 12—are allocated to the virtual storage areas in multiple virtual volumes 82 and, when allocating storage areas in the logical volumes created in the SSDs 70 or the SATAs 72 to the respective pages 90, 92, measures an access frequency per certain period of time (IOPS) of each page 90, 92 in the respective virtual volumes 82 and, based on the respective measurement results, allocates storage areas in the logical volumes created in the SSDs 70 are allocated to the pages whose access frequencies per certain period of time (IOPS) are higher than the Tier boundary values set for the respective virtual volumes 82, and storage areas in the logical volumes created in the SATAs 72 are allocated to the pages whose access frequencies per certain period of time (IOPS) are lower than the Tier boundary values set for the respective virtual volumes 82.

In this case, an average response time of, among the virtual volumes 82, the virtual volume 82 for which, for example, a response time (performance value) has been specified as a performance requirement is calculated based on the response time related to the storage devices (SSDs 70 or SATAs 72) and the access frequencies per certain period of time (TOPS) and whether or not the calculated value of the average response time satisfies the performance requirement of the virtual volumes 82 is determined.

Here, if, among the virtual volumes 82 for which response times have been specified, if there is [any virtual volume 82] whose calculated value of the average response time does not satisfy the performance requirement, the number of pages to add to be allocated from the SSDs enabling faster access than the SATAs 72—the number of pages with which the relevant virtual volume 82 can satisfy the performance requirement—is calculated based on the expressions (5) to (10), whether or not the same or larger number of unallocated pages as/than the calculated number of pages to add exists in any of the virtual volumes 82 is determined and, if the same or larger number of unallocated pages as/than the number of pages to add exists in any of the virtual volumes 82, allocates the pages equivalent to the number of pages to add to the virtual volume 82 where the same or larger number of unallocated pages as/than the number of pages to add exists.

Meanwhile, if the same or larger number of unallocated pages as/than the number of pages to add do not exist in any of the virtual volumes 82, whether or not the same or larger number of unallocated pages as/than the number of pages to add exists in, among the other virtual volumes 82, any of the virtual volumes 82 for which response times have been specified as performance requirements.

For example, when a virtual volume 82 for which the Tier boundary value $\beta$ has been set does not satisfy a performance requirement, the Tier boundary value $\beta$ of the virtual volume 82 for which the Tier boundary value $\beta$ has been set is adjusted to the Tier boundary value $\beta'$ so that the performance requirement is satisfied, and, if 15 pages are required as the number of pages equal to or larger than the number of pages to add, whether or not there are 15 pages, as the pages to be allocated from the SSDs 70, in the virtual volumes 82 for which performance requirements have been specified, and, if not, whether or not there are 15 pages, as the pages to be allocated from the SSDs 70, in any of the virtual volumes 82 for which performance requirements have not been specified.

Here, if, among the virtual volumes 82 for which, for example, response times (performance values) have been specified, a virtual volume 82 whose Tier boundary value has been set to the Tier boundary value $\gamma$ includes 15 pages as the pages to be allocated from the SSDs 70 when the Tier boundary value $\gamma$ is adjusted to the Tier boundary value $\gamma'$, the 15 pages, from among the pages of the virtual volume 82—release target virtual volume 82—whose the Tier boundary value has been adjusted to the Tier boundary value $\gamma'$ are released as the pages to be allocated from the SSDs 70.

Meanwhile, if, among the virtual volumes 82 for which response times have not been specified, a virtual volume 82 whose Tier boundary value that has been set to the Tier boundary value $\alpha$ will include 15 pages as the pages to be allocated from the SSDs 70 when the Tier boundary value $\alpha$ is adjusted to Tier boundary value $\alpha'$, the 15 pages, from among the pages of the virtual volume—release target virtual volume 82—whose Tier boundary value has been adjusted to the Tier boundary value $\alpha'$ are released as the pages to be allocated from the SSDs 70.

According to this embodiment, it is possible to allocate SSDs 70 and SATAs 72 of different performance (response times) appropriately to the multiple virtual volumes 82 having virtual storage areas which are access targets for the host computers 12, in accordance with the performance requirements of the respective virtual volumes 82.

Furthermore, according to this embodiment, it is possible to provide a strong guarantee of the performance of each virtual volume and allocate appropriate pages from the SSDs 70 and SATAs 72 to the virtual volumes 82 while considering the performance requirements of the respective virtual volumes 82.

REFERENCE SIGNS LIST

10 Storage system
12 Host computer
14 Management computer
16 Storage apparatus
18 Data network
20 Management network
22 Memory
26 Processor
36 Memory
40 Processor
54 Controller
56 Storage, 62 Memory, 64 Processor, 70 SSD, 72 SATA, 74 Physical media, 80 Pool, 82 Virtual volume

The invention claimed is:
1. A virtual volume control method, wherein
a controller:
recognizes a plurality of virtual volumes which have a virtual storage area as control targets, partitions the virtual storage area of each virtual volume into a plurality of blocks, sets the blocks as pages which are access targets from an access request source, and allocates a storage area in a plurality of logical volumes that are configured in a plurality of types of storage devices having different performance to each page;
measures an access frequency per a fixed time of each page of each of the virtual volumes:
based on the measurement result, allocates a storage area in a logical volume on a high performance storage device among the storage devices to a page of which an access frequency per a fixed time is higher than a boundary value of the virtual volume, meanwhile, allocates a storage area in a logical volume on a low performance storage device among the storage devices to a page of which an access frequency per a fixed time is lower than the boundary value of the virtual volume;
calculates a performance value of one or more virtual volumes which have performance requirements among the virtual volumes based on performance values of the storage devices allocated to the respective pages of the virtual volumes and access frequencies of the respective pages per a fixed time;
determines whether the performance requirements of the virtual volumes are satisfied based on the calculated values;
if there are any virtual volumes of which the performance requirements are not satisfied, calculates the number of additional pages which are allocated to the high performance storage devices among the storage devices to satisfy the performance requirements of the virtual volumes by adding the pages; and if the same or larger number of unallocated pages as/than the calculated number of additional pages do not exist in any of the virtual volumes, under the condition that, among virtual volumes other than the virtual volumes of which the performance requirements are not satisfied, there are any virtual volumes to which the same or larger number of pages as/than the calculated number of additional pages can be allocated, allocates the same or larger number pages as/than the calculated number of additional pages to that virtual volume, wherein the controller:

if the same or larger number of unallocated pages as/than the calculated number of additional pages exist in any of the virtual volumes, releases, among the pages of that virtual volume, the same or larger number of pages as/than the calculated number of additional pages;

allocates the released, same or larger number of pages as/than the number of additional pages to the virtual volume of which the performance requirements are not satisfied;

if the same or larger number of unallocated pages as/than the calculated number of additional pages do not exist in any of the virtual volumes, determines whether the same or larger number of pages as/than the calculated number of additional pages exist in, among virtual volumes other than the virtual volume of which the performance requirement is not satisfied, a virtual volume which has the performance requirement;

if the same or larger number of pages as/than the calculated number of additional pages exist in a virtual volume which has the performance requirement, releases, among the pages of this release target virtual volume, the same or larger number of pages as/than the calculated number of additional pages;

allocates the released, same or larger number of pages as/than the number of additional pages, to the virtual volume of which the performance requirement is not satisfied;

if the same or larger number of pages as/than the calculated number of additional pages do not exist in a virtual volume which has the performance requirement, determines whether the same or larger number of pages as/than the calculated number of additional pages exist in a virtual volume which does not have the performance requirement;

if the same or larger number of pages as/than the calculated number of additional pages exist in a virtual volume which does not have the performance requirement, releases, among the pages of this release target virtual volume, the same or larger number of pages as/than the calculated number of additional pages; and allocates the released, same or larger number of pages as/than the number of additional pages, to the virtual volume of which the performance requirement is not satisfied.

2. The virtual volume control method according to claim 1, wherein the controller:

adjusts, among boundary values which are reference values for determining the levels—high or low—of access frequencies of the respective pages per a fixed time and set for the virtual volumes respectively, a first boundary value (Tier boundary value $\beta$) set for the virtual volume of which the performance requirement is not satisfied to a value (Tier boundary value $\beta'$) that satisfies the performance requirement of the virtual volume; and calculates the number of additional pages, based on the adjusted first boundary value (Tier boundary value $\beta'$).

3. the virtual volume control method according to claim 1, wherein the controller:

if the same or larger number of unallocated pages as/than the calculated number of additional pages do not exist in any of the virtual volumes, determines whether the same or larger number of pages as/than the calculated number of additional pages exist in, among virtual volumes other than the virtual volume of which the performance requirement is not satisfied, a virtual volume which has the performance requirement;

if the same or larger number of pages as/than the calculated number of additional pages exist in a virtual volume which has the performance requirement, releases, among the pages of this release target virtual volume, the same or larger number of pages as/than the calculated number of additional pages; and allocates the released, same or larger number of pages as/than the number of additional pages, to the virtual volume of which the performance requirement is not satisfied.

4. The virtual volume control method according to claim 3, wherein the controller:

when determining whether the same or larger number of pages as/than the calculated number of additional pages exist in a virtual volume which has the performance requirement, determines whether, among virtual volumes which have the performance requirements, there is a virtual volume of which the performance requirement can be satisfied even when the pages to which high performance storage devices among the storage devices are allocated are reduced by the same or larger number of pages as/than the number of additional pages; and if there is a virtual volume of which the performance requirement can be satisfied even when the pages are reduced by the same or larger number of pages as/than the number of additional pages, sets that virtual volume as the release target virtual volume.

5. The virtual volume control method according to claim 1, the controller:

if the same or larger number of unallocated pages as/than the calculated number of additional pages do not exist in any of the virtual volumes, determines whether it is possible to adjust a second boundary value (Tier boundary value $\gamma$), which is a boundary value set for, among virtual volumes other than the virtual volume of which the performance requirement is not satisfied, a virtual volume which has the performance requirement and is a reference value for determining the level—high or low—of the access frequency per a fixed time of each page of the virtual volume which has the performance requirement, to a value (Tier boundary value $\gamma'$) that satisfies the performance requirement even when the pages are reduced, in the virtual volume which has the performance requirement, by the same or larger number of pages as/than the number of additional pages;

while recognizing the virtual volume whose second boundary value is adjustable as a release target virtual volume, releases, among the pages of the release target virtual volume, the same or larger number of pages as/than the calculated number of additional pages; and allocates the released, same or larger number of pages as/than the number of additional pages, to the virtual volume of which the performance requirement is not satisfied.

6. The virtual volume control method according to claim 1, the controller:

when the same or larger number of unallocated pages as/than the calculated number of additional pages do not exist in any of the virtual volumes, determines whether the same or larger number of pages as/than the calculated number of additional pages exist in, among virtual volumes other than the virtual volume of which the performance requirement is not satisfied, a virtual volume which has the performance requirement;

if the same or larger number of pages as/than the calculated number of additional pages do not exist in a virtual volume which has the performance requirement, determines whether the same or larger number of pages as/than the calculated number of additional pages exist in a virtual volume which does not have the performance requirement;

if the same or larger number of pages as/than the calculated number of additional pages exist in a virtual volume which does not have the performance requirement, releases, among the pages of the release target virtual volume, the same or larger number of pages as/than the calculated number of additional pages; and allocates the released, same or larger number of pages as/than the number of additional pages, to the virtual volume of which the performance requirement is not satisfied.

7. The virtual volume control method according to claim 6, wherein the controller:

when determining whether the same or larger number of pages as/than the calculated number of additional pages exist in a virtual volume which does not have the performance requirement, determines whether it is possible to reduce, in the virtual volume which does not have the performance requirement, the pages to which a high performance storage device among the storage devices is allocated, by the same or larger number of pages as/than the number of additional pages; and if it is possible to reduce the pages by the same or larger number of pages as/than the number of additional pages, sets the virtual volume as the release target virtual volume.

8. The virtual volume control method according to claim 1, wherein the controller:

if the same or larger number of unallocated pages as/than the calculated number of additional pages do not exist in any of the virtual volumes, determines whether the same or larger number of pages as/than the calculated number of additional pages exist in, among virtual volumes other than the virtual volume of which the performance requirement is not satisfied, a virtual volume which has the performance requirement;

if the same or larger number of pages as/than the calculated number of additional pages do not exist in a virtual volume which has the performance requirement, determines whether it is possible to adjust a third boundary value (Tier boundary value $\alpha$), which is a boundary value set for a virtual volume which does not have the performance requirement and is a reference value for determining the level—high or low—of the access frequency per a fixed time of each page of the virtual volume which does not have the performance requirement, to a value (Tier boundary value $\alpha'$) with which it is possible to reduce the pages, of the virtual volume which does not have the performance requirement, by the same or larger number of pages as/than the number of additional pages;

while recognizing the virtual volume whose third boundary value is adjustable as a release target virtual volume, releases, among the pages of the release target virtual volume, the same or larger number of pages as/than the calculated number of additional pages; and allocates the released, same or larger number of pages as/than the number of additional pages, to the virtual volume of which the performance requirement is not satisfied.

9. A storage apparatus comprising:

a plurality of types of storage devices having different performance; and a controller that recognizes a plurality of virtual volumes which have a virtual storage area as control targets, partitions the virtual storage area of each virtual volume into a plurality of blocks, sets the blocks as pages which are access targets from an access request source, and allocates a storage area in a plurality of logical volumes that are configured in a plurality of types of storage devices having different performance to each page, wherein the controller:

measures an access frequency per a fixed time of each page of each of the virtual volumes;

based on the measurement result, allocates a storage area in a logical volume on a high performance storage device among the storage devices, to a page of which an access frequency per a fixed time is higher than a boundary value of the virtual volume, meanwhile, allocates a storage area in a logical volume on a low performance storage device among the storage devices to a page of which an access frequency per a fixed time is lower than the boundary value of the virtual volume;

calculates a performance value of one or more virtual volumes which have performance requirements among the virtual volumes based on performance values of the storage devices allocated to the respective pages of the virtual volumes and access frequencies of the respective pages per a fixed time;

determines whether the performance requirements of the virtual volumes are satisfied based on the calculated values;

if there are any virtual volumes of which the performance requirements are not satisfied, calculates the number of additional pages, which are allocated to the high performance storage devices among the storage devices to satisfy the performance requirements of the virtual volumes by adding the pages; and if the same or larger number of unallocated pages as/than the calculated number of additional pages do not exist in any of the virtual volumes, under the condition that, among virtual volumes other than the virtual volumes of which the performance requirements are not satisfied, there are any virtual volumes to which the same or larger number of pages as/than the calculated number of additional pages can be allocated, allocates the same or larger number pages as/than the calculated number of additional pages to that virtual volume, wherein the controller:

if the same or larger number of unallocated pages as/than the calculated number of additional pages do not exist in any of the virtual volumes, determines whether the same or larger number of pages as/than the calculated number of additional pages exist in, among virtual volumes other than the virtual volume of which the performance requirement is not satisfied, a virtual volume which has the performance requirement;

if the same or larger number of pages as/than the calculated number of additional pages exist in a virtual volume which has the performance requirement, releases, among the pages of this release target virtual volume, the same or larger number of pages as/than the calculated number of additional pages; and allocates the released, same or larger number of pages as/than the number of additional pages, to the virtual volume of which the performance requirement is not satisfied.

10. The storage apparatus according to claim 9, wherein the controller:

adjusts, among boundary values which are reference values for determining the levels—high or low —of access frequencies of the respective pages per a fixed time and set for the virtual volumes respectively, a first boundary value (Tier boundary value $\beta$) set for the virtual volume of which the performance requirement is not satisfied to a value that satisfies the performance requirement of the virtual volume; and calculates the number of additional pages, based on the adjusted first boundary value (Tier boundary value $\beta'$).

11. The storage apparatus according to claim 9, wherein the controller:

if the same or larger number of unallocated pages as/than the calculated number of additional pages do not exist in any of the virtual volumes, determines whether it is possible to adjust a second boundary value (Tier boundary value $\gamma$), which is a boundary value set for, among virtual volumes other than the virtual volume of which the performance requirement is not satisfied, a virtual volume which has the performance requirement and is a reference value for determining the level—high or low—of the access frequency per a fixed time of each page of the virtual volume which has the performance requirement, to a value (Tier boundary value $\gamma'$) that satisfies the performance requirement even when the pages are reduced, in the virtual volume which has the performance requirement, by the same or larger number of pages as/than the number of additional pages;

while recognizing the virtual volume whose second boundary value is adjustable as a release target virtual volume, releases, among the pages of the release target virtual volume, the same or larger number of pages as/than the calculated number of additional pages; and allocates the released, same or larger number of pages as/than the number of additional pages, to the virtual volume of which the performance requirement is not satisfied.

12. The storage apparatus according to claim 9, wherein the controller:

when the same or larger number of unallocated pages as/than the calculated number of additional pages do not exist in any of the virtual volumes, determines whether the same or larger number of pages as/than the calculated number of additional pages exist in, among virtual volumes other than the virtual volume of which the performance requirement is not satisfied, a virtual volume which has the performance requirement;

if the same or larger number of pages as/than the calculated number of additional pages do not exist in a virtual volume which has the performance requirement, determines whether the same or larger number of pages as/than the calculated number of additional pages exist in a virtual volume which does not have the performance requirement;

if the same or larger number of pages as/than the calculated number of additional pages exist in a virtual volume which does not have the performance requirement, releases, among the pages of the release target virtual volume, the same or larger number of pages as/than the calculated number of additional pages; and allocates the released, same or larger number of pages as/than the number of additional pages, to the virtual volume of which the performance requirement is not satisfied.

13. The storage apparatus according to claim 9, wherein the controller:

if the same or larger number of unallocated pages as/than the calculated number of additional pages do not exist in any of the virtual volumes, determines whether the same or larger number of pages as/than the calculated number of additional pages exist in, a virtual volume which has the performance requirement among virtual volumes other than the virtual volume of which the performance requirement is not satisfied;

if the same or larger number of pages as/than the calculated number of additional pages do not exist in a virtual volume which has the performance requirements, determines whether it is possible to adjust a third boundary value (Tier boundary value $\alpha$), which is a boundary value set for a virtual volume which does not have the performance requirement and is a reference value for determining the level—high or low—of the access frequency per a fixed time of each page of the virtual volume which does not have the performance requirement, to a value (Tier boundary value $\alpha'$) with which it is possible to reduce the pages, of the virtual volume which does not have the performance requirement, by the same or larger number of pages as/than the number of additional pages;

while recognizing the virtual volume whose third boundary value is adjustable as a release target virtual volume, releases, among the pages of the release target virtual volume, the same or larger number of pages as/than the calculated number of additional pages; and allocates the released, same or larger number of pages as/than the number of additional pages, to the virtual volume of which the performance requirement is not satisfied.

* * * * *